US010402331B2

(12) United States Patent
Hagersten et al.

(10) Patent No.: US 10,402,331 B2
(45) Date of Patent: Sep. 3, 2019

(54) SYSTEMS AND METHODS FOR IMPLEMENTING A TAG-LESS SHARED CACHE AND A LARGER BACKING CACHE

(71) Applicant: Samsung Electronics Co., Ltd., Suwon-si, Gyeonggi-do (KR)

(72) Inventors: Erik Hagersten, Uppsala (SE); Andreas Sembrant, Uppsala (SE); David Black-Schaffer, Uppsala (SE); Stefanos Kaxiras, Uppsala (SE)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/702,183

(22) Filed: May 1, 2015

(65) Prior Publication Data

US 2015/0347297 A1  Dec. 3, 2015

Related U.S. Application Data

(60) Provisional application No. 62/051,277, filed on Sep. 16, 2014, provisional application No. 62/004,413, filed on May 29, 2014.

(51) Int. Cl.
*G06F 12/00* (2006.01)
*G06F 12/0855* (2016.01)
(Continued)

(52) U.S. Cl.
CPC ........ *G06F 12/0855* (2013.01); *G06F 12/084* (2013.01); *G06F 12/0811* (2013.01);
(Continued)

(58) Field of Classification Search
None
See application file for complete search history.

(56) References Cited

U.S. PATENT DOCUMENTS 4,727,482 A  2/1988  Roshon-Larsen et al.
5,778,427 A  7/1998  Hagersten et al.
(Continued)

FOREIGN PATENT DOCUMENTS

EP  2869208 A1  5/2015

OTHER PUBLICATIONS

Sherwood et al., "Automatically Characterizing Large Scale Program Behavior", Proceedings of the 10th International Conference on Architectural Support for Programming Languages and Operating Systems, Oct. 5-9, 2002, San Jose, California.
(Continued)

*Primary Examiner* — Baboucarr Faal
(74) *Attorney, Agent, or Firm* — Harness, Dickey & Pierce, P.L.C.

(57) ABSTRACT

A computer processing system includes a plurality of nodes, each node having at least one processor core and at least one level of cache memory which is private to the node, a shared, last level cache (LLC) memory device and a shared, last level cache location buffer containing cache location entries, each cache location entry storing an address tag and a plurality of location information. The location information stored in a cache location entry points to an identified cacheline location within the LLC that stores a cacheline associated with the location information. The cacheline stored in the LLC has associated information identifying the cache location entry.

17 Claims, 26 Drawing Sheets

(51) Int. Cl.
| | |
|---|---|
| *G06F 12/0862* | (2016.01) |
| *G06F 12/084* | (2016.01) |
| *G06F 12/0846* | (2016.01) |
| *G06F 12/0811* | (2016.01) |
| *G06F 12/0888* | (2016.01) |
| *G06F 12/0817* | (2016.01) |

(52) U.S. Cl.
CPC ...... *G06F 12/0846* (2013.01); *G06F 12/0862* (2013.01); *G06F 12/0888* (2013.01); *G06F 12/0817* (2013.01); *G06F 2212/1016* (2013.01); *G06F 2212/1021* (2013.01); *G06F 2212/1041* (2013.01); *G06F 2212/283* (2013.01); *G06F 2212/452* (2013.01); *G06F 2212/6028* (2013.01); *G06F 2212/6046* (2013.01); *Y02D 10/13* (2018.01)

(56) References Cited

U.S. PATENT DOCUMENTS

| | | | |
|---|---|---|---|
| 5,996,048 | A | 11/1999 | Cherabuddi et al. |
| 6,247,094 | B1 | 6/2001 | Kumar et al. |
| 6,467,027 | B1 | 10/2002 | Kyker et al. |
| 7,796,137 | B1 | 9/2010 | Mrazek et al. |
| 8,631,206 | B1 | 1/2014 | O'Bleness et al. |
| 9,348,602 | B1 | 5/2016 | Alapati et al. |
| 2003/0154345 | A1 | 8/2003 | Lyon |
| 2004/0003182 | A1 | 1/2004 | Cypher |
| 2006/0143384 | A1 | 6/2006 | Hughes et al. |
| 2007/0022256 | A1* | 1/2007 | Cantin ............ G06F 12/0831 711/144 |
| 2008/0040555 | A1 | 2/2008 | Iyer et al. |
| 2008/0162895 | A1 | 7/2008 | Luick |
| 2009/0144492 | A1 | 6/2009 | Barth et al. |
| 2009/0182971 | A1 | 7/2009 | Greiner et al. |
| 2009/0222626 | A1* | 9/2009 | Ingle .................. G06F 12/121 711/133 |
| 2010/0329256 | A1 | 12/2010 | Akella et al. |
| 2012/0137075 | A1 | 5/2012 | Vorbach |
| 2013/0304991 | A1 | 11/2013 | Bottcher et al. |
| 2014/0173379 | A1 | 6/2014 | Loh et al. |
| 2014/0351518 | A1* | 11/2014 | Chang .............. G06F 12/0811 711/122 |
| 2015/0143046 | A1 | 5/2015 | Hagersten et al. |
| 2015/0234745 | A1 | 8/2015 | Roy et al. |

OTHER PUBLICATIONS

Singhal et al., "Gigaplane™: A High Performance Bus for Large SMPs," Jul. 16, 1996.
Sodani et al., "Race to Exascale: Opportunities and Challenges", 44th Annual IEEE/ACM International Symposium on Microarchitecture, 2011, Dec. 7, 2011, Keynote Speech.
"SPECjbb2005", Standard Performance Evaluation Corporation, http://www.spec.org/jbb2005/, downloaded Nov. 17, 2014.
"TPC-C V5", Transaction Processing Performance Council, http://www.tpc.org/tpcc/default.asp, downloaded Nov. 17, 2014.
Written Opinion in corresponding International Application No. PCT/IB2014/066211 dated Mar. 23, 2015.
Written Opinion in corresponding International Application No. PCT/IB2014/066212 dated Mar. 23, 2015.
Written Opinion dated Jan. 31, 2017 in related International Application No. PCT/IB2016/056655.
Woo et al., "The SPLASH-2 Programs: Characterization and Methodological Considerations," Proceedings of the 22nd Annual International Symposium on Computer Architecture, pp. 24-36, Jun. 1995.
Zebchuk et al., "A Framework for Coarse-Grain Optimizations in the On-Chip Memory Hierarchy", Proceedings of the 40th Annual IEEE/ACM International Symposium on Microarchitecture, Dec. 1-5, 2007, Chicago, Illinois.
Zhang et al., "Two Fast and High-Associativity Cache Schemes", IEEE Micro, Sep./Oct. 2007, pp. 40-49.
Basu et al., "Reducing Memory Reference Energy with Opportunistic Virtual Caching", ISCA '12 Proceedings of the 39th Annual International Symposium on Computer Architecture, Jun. 9-13, 2012, Portland, Oregon.
Batson et al., "Reactive-Associative Caches", Proceedings of International Conference on Parallel Architecture and Compilation Techniques, Sep. 8-12, 2001, Barcelona, Spain.
Beckmann et al., "Managing Wire Delay in Large Chip-Multiprocessor Caches", MICRO 37 Proceedings of the 37th Annual IEEE/ACM International Symposium on Microarchitecture, Dec. 4-8, 2004, Portland, Oregon.
Bienia et al., "PARSEC vs. SPLASH-2: A Quantitative Comparison of Two Multithreaded Benchmark Suites on Chip-Multiprocessors," IEEE International Symposium on Workload Characterization, IISWC 2008, Sep. 14-16, 2008, Seattle, WA.
Bienia et al., "The PARSEC Benchmark Suite: Characterization and Architectural Implications," Proceedings of the 17th International Conference on Parallel Architectures and Compilation Techniques, PACT '08, Oct. 25-29, 2008, Toronto, Ontario, CA.
Binkert et al., "The gem5 Simulator", ACM SIGARCH Computer Architecture News, May 2011, vol. 39, No. 2.
Boettcher et al., "MALEC: A Multiple Access Low Energy Cache", Proceedings of Design, Automation, & Test in Europe Conference & Exhibition (DATE), Mar. 18-22, 2013, Grenoble, France.
Calder et al., "Predictive Sequential Associative Cache", 2nd International Symposium on High Performance Computer Architecture, Feb. 1996, San Jose, California.
Censier et al., "A New Solution to Coherence Problems in Multicache Systems," IEEE Transactions on Computers, Dec. 1978, vol. C-27, No. 12.
Charlesworth, "The Sun Fireplane System Interconnect," Proceedings of the 2001 ACM/IEEE Conference on Supercomputing, SC '01, Nov. 10-16, 2001, Denver, CO.
Chishti et al., "Distance Associativity for High-Performance Energy-Efficient Non-Uniform Cache Architectures", Proceedings of the 36th Annual International Symposium on Microarchitecture (MICRO-36 2003), Dec. 3-5, 2003, San Diego, California.
Cho et al., "Managing Distributed, Shared L2 Caches through OS-Level Page Allocation," 39th Annual IEEE/ACM Symposium on Microarchitecture, MICRO-39, Dec. 9-13, 2006, Orlando, FL.
Cuesta et al., "Increasing the Effectiveness of Directory Caches by Deactivating Coherence for Private Memory Blocks," ISCA '11, Jun. 4-8, 3022, San Jose, CA.
Goodman, "Using Cache Memory to Reduce Processor-Memory Traffic," ISCA '83 Proceedings of the 10th Annual International Symposium on Computer Architecture, pp. 124-131, Jun. 13-17, 1983, Stockholm, SE.
Hagersten et al., "WildFire: A Scalable Path for SMPs," Proceedings of the Fifth International Symposium on High-Performance Computer Architecture, Jan. 9-12, 1999, Orlando, FL.
Hallnor et al., "A Fully Associative Software-Managed Cache Design", Proceedings of the 27th Annual International Symposium on Computer Architecture, Jun. 10-14, 2000, pp. 107-116.
Hardavellas et al., "Reactive NUCU: Near-Optimal Block Placement and Replication in Distributed Caches", Proceedings of the 36th Annual International Symposium on Computer Architecture, Jun. 2009, Austin, Texas.
Henning, "SPEC CPU2006 Benchmark Descriptions", SIGARCH Computer Architecture News, Sep. 2006, vol. 34, No. 4.
Hossain et al., "POPS: Coherence Protocol Optimization for both Private and Shared Data," 2011 International Conference on Parallel Architectures and Compilation Techniques (PACT), Oct. 10-14, 2011, Galveston Island, TX.
Intel Corporation, "Intel Architecture Instruction Set Extensions Programming Reference", Feb. 2012, 319433-012A.
International Search Report in corresponding International Application No. PCT/IB2014/066211 dated Mar. 23, 2015.
International Search Report in corresponding International Application No. PCT/IB2014/066212 dated Mar. 23, 2015.
International Search Report dated Jan. 31, 2017 in related International Application No. PCT/IB2016/056655.

(56) References Cited

OTHER PUBLICATIONS

Kaxiras et al., "Computer Architecture Techniques for Power-Efficiency", Synthesis Lectures on Computer Architecture #4, Jun. 2008, Morgan and Claypool Publishers.
Kim et al., "An Adaptive, Non-Uniform Cache Structure for Wire-Delay Dominated On-Chip Caches", Proceedings of the 10th International Conference on Architectural Support for Programming Language and Operating Systems (ASPLOS), Oct. 5-9, 2009, San Jose, California.
Kim et al., "Subspace Snooping: Filtering Snoops with Operating System Support," 19th International Conference on Parallel Architectures and Compilation Techniques (PACT), PACT '10, Sep. 11-15, 2010, Vienna, AT.
Laudon et al., "The SGI Origin: A ccNUMA Highly Scalable Server," ISCA '97 Proceedings of the 24th Annual International Symposium on Computer Architecture, pp. 241-251, Jun. 2-4, 1997, Denver, CO.
Li et al., "McPAT: An Integrated Power, Area, and Timing Modeling Framework for Multicore and Manycore Architectures", Micro'09, Dec. 12-16, 2009, New York, New York.
Luk et al., "Pin: Building Customized Program Analysis Tools with Dynamic Instrumentation", PLDI'05, Jun. 12-15, 2005, Chicago, Illinois, pp. 190-200.
Lynch, "The Interaction of Virtual Memory and Cache Memory", Technical Report CSL-TR-93-587, Oct. 1993.
Min et al., "Location Cache: A Low-Power L2 Cache System", ISLPED'04, Aug. 9-11, Newport Beach, California, pp. 120-125.
Muralimanohar et al., "CACTI 6.0: A Tool to Model Large Caches", International Symposium on Microarchitecture, Dec. 2007, Chicago, Illinois, HP Laboratories.
Office Action in related U.S. Appl. No. 14/549,042 dated Feb. 2, 2017.
Office Action in related U.S. Appl. No. 14/549,042 dated May 16, 2016.
Office Action in related U.S. Appl. No. 14/549,065 dated Feb. 2, 2017.
Office Action in related U.S. Appl. No. 14/549,065 dated May 24, 2016.
Office Action in related U.S. Appl. No. 14/702,137 dated Jan. 13, 2017.
Office Action in related U.S. Appl. No. 14/702,153 dated Jan. 3, 2017.
Office Action in related U.S. Appl. No. 14/702,169 dated Nov. 18, 2016.
Office Action in related U.S. Appl. No. 14/702,183 dated Nov. 4, 2016.
Powell et al., "Reducing Set-Associative Cache Energy via Way-Prediction and Selective Direct-Mapping", Proceedings of the 34th Annual International Symposium on Microarchitecture (MICRO), Dec. 2-5, 2001, Austin, Texas.
Pugsley et al., "SWEL: Hardware Cache Coherence Protocols to Map Shared Data onto Shared Caches," Proceedings of the 19th International Conference on Parallel Architecture and Compilation Techniques, PACT '10, Sep. 11-15, 2010, Vienna, AT.
Qiu et al., "The Synonym Lookaside Buffer: A Solution to the Synonym Problem in Virtual Caches", IEEE Transactions on Computers, Dec. 2008, vol. 57, No. 12.
Qureshi et al., "The V-Way Cache: Demand-Based Associativity via Global Replacement", Proceedings of the 32nd International Symposium on Computer Architecture (ISCA'05), Jun. 4-8, 2005.
Sanchez et al., "The ZCache: Decoupling Ways and Associativity", Proceedings of the 43rd Annual IEEE/ACM Symposium on Microarchitecture (MICRO-43), Dec. 4-8, 2010, Atlanta, Georgia.
Sembrant et al., "Efficient Software-based Online Phase Classification", 2011 IEEE International Symposium on Workload Characterization (IISWC), Nov. 6-8, 2011, Austin, Texas, pp. 104-115.
Sembrant et al., "The Direct-to-Direct (D2D) Cache: Navigating the Cache Hierarchy with a Single Lookup," ISCA 14 Proceedings of the 41st Annual International Symposium on Computer Architecture, Jun. 14-18, 2014, Minneapolis, MN.
Sembrant et al., "TLC: A Tag-Less Cache for Reducing Dynamic First Level Cache Energy", MICRO-46, Dec. 7-11, 2013, Davis, California, Revised Version, Jan. 14, 2014.
Seznec, "A case for two-way skewed-associative caches", ISCA'93 Proceedings of the 20th Annual International Symposium on Computer Architecture, May 16-19, 1993, San Diego, California, pp. 169-178.
Seznec, "Don't use the page number, but a pointer to it", ISCA'96 Proceedings of the 23rd Annual International Symposium on Computer Architecture, May 22-24, 1996, Philadelphia, Pennsylvania, pp. 104-113.
Office Action dated Apr. 6, 2017 in related U.S. Appl. No. 14/702,169.
Office Action dated Jul. 10, 2017 in related U.S. Appl. No. 14/549,042.
Office Action dated Jul. 13, 2017 in related U.S. Appl. No. 14/702,153.
Office Action dated Mar. 24, 2017 in related U.S. Appl. No. 14/702,137.
Office Action dated Nov. 16, 2017 in related U.S. Appl. No. 14/702,169.
Office Action dated Nov. 2, 2017 in related U.S. Appl. No. 14/702,137.
Office Action dated Nov. 14, 2018 in related U.S. Appl. No. 14/702,137.
Wang et al. "Organization and performance of a two-level virtual-real cache hierarchy". Jun. 1989. ACM SIGARCH Computer Architecture News-Special Issue: Proceedings of the 16th annual international symposium on Computer Architecture. vol. 17, issue 3, p. 140-148. New York, NY,USA. (Year:1989).
Office Action dated Apr. 2, 2018 in related U.S. Appl. No. 14/549,042.
Office Action dated Apr. 20, 2018 in related U.S. Appl. No. 14/702,137.
Office Action dated Sep. 21, 2018 in related U.S. Appl. No. 14/549,042.
Office Action dated Mar. 26, 2019 in related U.S. Appl. No. 14/549,042.

* cited by examiner

SYSTEMS AND METHODS FOR IMPLEMENTING A TAG-LESS SHARED CACHE AND A LARGER BACKING CACHE

RELATED APPLICATIONS

The present application is related to, and claims priority from U.S. Provisional Patent Application No. 62/004,413, filed May 29, 2014, entitled "SYSTEM AND METHOD OF IDENTIFYING CACHE LOCATIONS IN A CACHE HIERARCHY," to Erik Hagersten et al., and to U.S. Provisional Patent Application No. 62/051,277, filed Sep. 16, 2014, entitled "SYSTEM AND METHOD OF IDENTIFYING CACHE LOCATIONS IN A CACHE HIERARCHY," to Erik Hagersten et al., the disclosures of both of which are incorporated herein by reference.

TECHNICAL FIELD

Embodiments of the subject matter disclosed herein generally relate to methods and systems for accessing data in computer memory devices and, more particularly, to mechanisms and techniques for implementing a cache hierarchy.

BACKGROUND

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (referred to as higher-level caches) close to the main memory and smaller and faster caches (referred to as lower-level caches) closer to the processor. This configuration is typically referred to as a cache hierarchy or memory hierarchy. Each level in the cache hierarchy is referred to as a cache level. FIG. 1 depicts a computer system, where each CPU 101 is assigned its own first-level cache 102 (L1 cache). In this example, the second-level cache 103 is shared by all the CPUs 101 and may contain data and instructions that are accessed by all of the CPUs 101. Memory 105 also stores instructions and data that are accessed by all CPUs 101. The (main) memory 105 is typically accessed using a physical address, or PA for short, while the addresses generated by a CPU 101 are typically virtual addresses.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 shows a more detailed view of the cache organization from FIG. 1, where the CPU 204 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 204 and the level 2 (and potentially higher level) caches 207. FIG. 2 also shows a high-capacity memory 208 connected to the cache hierarchy.

When a CPU 204 requests data that is present in the cache, referred to as a cache hit, that request can be serviced much faster than an access to data that is not present in the cache, referred to as a cache miss. Typically, an application running on the CPU 204 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume In order to understand how to develop solutions to this cache hit/miss problem, some understanding of cache organization and terminology will be useful. Typically, data are installed into caches in fixed chunks that are larger than the word size of a processor, known as cachelines. Common cacheline sizes today are, for example, 32, 64 and 128 bytes, but as will be appreciated by those skilled in the art both larger and smaller cacheline sizes exist for various cache implementations. The cacheline size may also be variable for some cache implementations.

A common way to organize the data placement in memory 208 is in a manner that each data word is statically mapped to reside in one specific cacheline. Each cache typically has an index function that identifies a portion of the cache where each cacheline can reside, known as a set. The set may contain space to hold one or more cachelines at the same time. The number of cachelines which the set can hold is referred to as its associativity. Often, the associativity for all of the sets in a cache is the same. Such caches are often referred to as set-associative caches. The associativity may also vary between the sets. Each of the spaces in a set that can hold a cacheline is referred to as a way.

In order to determine the identity of each cacheline stored in each set, cachelines in a cache each have some identifier associated with them. One common example of such an identifier is an address tag. In this description, all such identifiers will be collectively referred to as address tags. When looking for a specific cacheline in a cache, its address may be used to determine the set of the cache where it may reside. The address tags of the cachelines of the corresponding set are compared to a tag portion of the address used to identify a cacheline (see, e.g., TAG and ATAG depicted in FIG. 3 and described below) to determine if the desired cacheline resides in the cache, and if so, in which way it resides, i.e., in which of the spaces in a set that can hold a cacheline it resides.

Often, each cache has built-in strategies to determine which cacheline to keep in the set and which cacheline to evict (also referred to as replace) to make space for a new cacheline being brought into the set, referred to as its replacement policy. The replaced cacheline is known as a victim or a replaced cacheline. Popular replacement policies used in conjunction with cache memories include, but are not limited to, least-recently used (LRU), pseudo-LRU and random replacement policies.

So-called inclusive cache hierarchies require that a copy of a block of data (for example a cacheline) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cacheline) existing in the entire cache hierarchy, while non-inclusive hierarchies can have a mixture of both strategies. In exclusive and non-inclusive cache hierarchies, it is common that a cacheline is installed in the next higher cache level upon eviction from a given cache level.

With this background on caches and cachelines in mind, this discussion now proceeds to illustrate one conventional technique for identifying specific cache locations within a cache hierarchy like that shown in FIGS. 1 and 2. FIG. 3 shows an example of the organization of a processing system containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P-OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cacheline containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cacheline. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

To summarize the discussion associated with FIG. 3, it will be appreciated by those skilled in the art that contemporary implementations of a cache hierarchy may require many associative lookups to be performed in TLBs as well as at different cache levels before the location of a requested cacheline can be determined. Furthermore, each translation entry and cached cacheline needs to be accompanied by an address tag and a plurality of these tags need to be compared with a portion of an address at each of these levels. Overall, this implementation comes at an enormous cost in terms of the dynamic energy used for each associative lookup. It also requires substantial overhead in static energy and memory capacity to store the extra tag information that is needed to perform the comparisons.

Accordingly, it would be desirable to provide systems and methods that avoid the afore-described problems and drawbacks associated with cache lookups for data.

SUMMARY

Methods and systems for cache hierarchy implementations are described.

According to an embodiment, a computer processing system includes a plurality of nodes, each node having at least one processor core and at least one level of cache memory which is private to the node, a shared, last level cache (LLC) memory device; and a shared, last level cache location buffer containing cache location entries, each cache location entry storing an address tag and a plurality of location information, wherein the location information stored in a cache location entry points to an identified cacheline location within the LLC that stores a cacheline associated with the location information, and wherein the cacheline stored in the LLC has associated information identifying the cache location entry.

According to another embodiment, a system includes at least one node, each node including at least one processor core and at least two levels of cache hierarchy; a last level cache (LLC) memory device; an LLC location buffer containing cache location entries, each cache location entry storing an address tag and location information; and a highest level giant cache (GCACHE), wherein the location information points to an identified location within the LLC, a GCACHE location within the GCACHE, or one of the at least one nodes, and wherein the cacheline in the LLC has associated information identifying the cache location entry.

According to another embodiment, a system includes at least one processor core and at least two levels of cache hierarchy; a last level cache (LLC) memory device; an LLC location buffer containing cache location entries, each cache location entry storing an address tag and location information; a highest level giant cache (GCACHE); wherein the location information points to an identified location within the LLC or a GCACHE location within the GCACHE, and wherein the cacheline in the LLC has associated information identifying the cache location entry.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
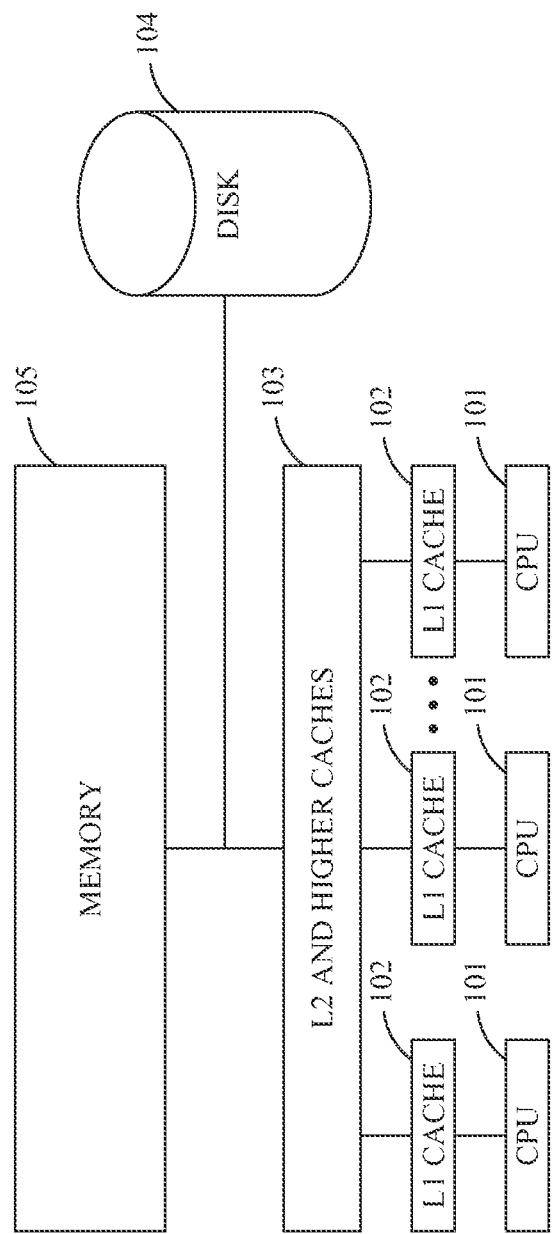
FIG. 1 is a block diagram of a multi-processor system.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of particular cache hierarchies and methods for performing lookups in such hierarchies. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following description numerous details provide a thorough understanding of the embodiments. These details include functional blocks and an exemplary cache location table CLB for implementing an efficient cache tagging scheme. In addition, while the cache tagging scheme of the embodiments is described with reference to specific caches and computer architectures, the embodiments are applicable to a wide range of memory and system architectures. In other instances, well-known circuits and structures are not described in detail so as not to obscure the embodiments unnecessarily.

According to various embodiments described herein, methods and systems provide for, among other things, cache handling schemes (CHS) which explicitly store location information (LI). The LI is leveraged for efficiently accessing a multi-way cache of a computer system having a main memory and one or more processors. The CHS tracks the contents of the cache hierarchy, which may consist of several levels of associative caches, with a cache location buffer (CLB) or some hierarchy of CLBs. The caches include a plurality of cache lines divided into a number of segments corresponding to the number of ways In accordance with the embodiments, instead of discarding useful location information, which is known every time a cache line is moved between the levels in the hierarchy, the location information is stored (e.g., updated) in the CHS and utilized for later cache access. The CLB is organized in an associative way. Accordingly, each CLB entry includes an address tag field and a plurality of LIs associated with the address tag field, although other techniques for storing the location information are possible according to other embodiments. Subsequently, the information stored in the CLB can be used to quickly access the location of the requested data without the need for additional associative lookups. More precisely, the CLB provides location information LI from which the right cache level, as well as the right location in the cache, can be determined without the need to access any address tags of the cache. Thus, using techniques in accordance with these embodiments, requested data can be found more quickly in the cache hierarchy, and in a manner which consumes less energy.

For a cache hierarchy consisting of set-associative cache with the same associativity, the number of bits in each LI is dependent on the number of ways and number of caches of the cache hierarchy covered by the CLB. Some LI values can be reserved to store certain patterns with certain hardcoded meanings. For example, one LI value can be reserved for a memory pattern, implying that the data is not in the part of the memory hierarchy covered by CHS. In this implementation, the number of LI bit(s) is equal to the log base 2 of the number of way(s) plus the number of cache levels covered by the CLB plus one (i.e., log 2(way+levels+1)). If the number of ways of the different cache levels varies, or if caches other than set-associative caches are used, those skilled in the art will appreciate that other LI representations are possible.

Access of the cache via the CLB by the CHS can, for example, be generally performed as follows according to an embodiment. Upon receiving an address of a target cache line, the CLB attempts to match an address field of one of the cache location entries (CLE) which it has stored therein with a TAG portion of the address. If there is a match, an LI of the CLB entry is retrieved using a LI-offset portion of the address. The CHS indexes directly into a single cache line of the cache using the LI value, and an index part of an address. Thus, the cache does not need to store any address tag information.

Figure 2:
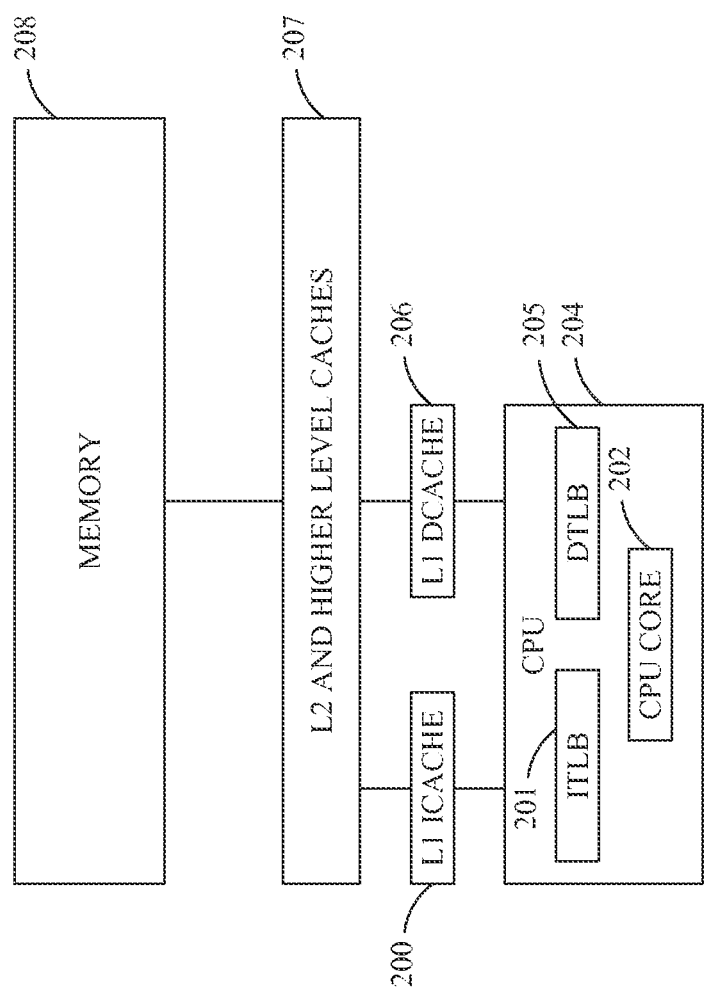
FIG. 2 is a block diagram of a uni-processor system cache hierarchy.

Thus, in accordance with the embodiments, systems such as those illustrated in FIG. 1 and FIG. 2, can also include a cache handling scheme (CHS) as described herein. That scheme includes a cache location buffer (CLB), or a hierarchy of CLBs, that keep track of the location of data units stored in a cache hierarchy. Whenever a data unit is moved in the cache hierarchy, its new location is recorded in the CLB.

The CLB according to such embodiments may be implemented as an associative organization, storing a plurality of cache location entries (CLE). Each CLE contains an address tag, used for the associative lookup, and some payload, for example a cache location table (CLT), storing a plurality of location information (LI). Other fields that may be included in the payload of a CLT include, but are not limited to, physical indices (PI), which store a partial or full address translation to physical addresses, statistics of access patterns to its associated cachelines, information about instructions accessing the data, access rights to the data tracked by this CLT, other derived or discovered metadata about the cache line, and pointers to various other hardware structures.

To illustrate these, and other features, of various embodiments, such embodiments will now be described with respect to FIGS. 4-23. For clarity, those skilled in the art will appreciate that these Figures illustrate logical implementations of the embodiments rather than actual physical implementations. Those skilled in the art will thus understand that these diagrams show logical representations of implementations and that physical implementations may differ substantially in their implementation details.

Figure 4A:
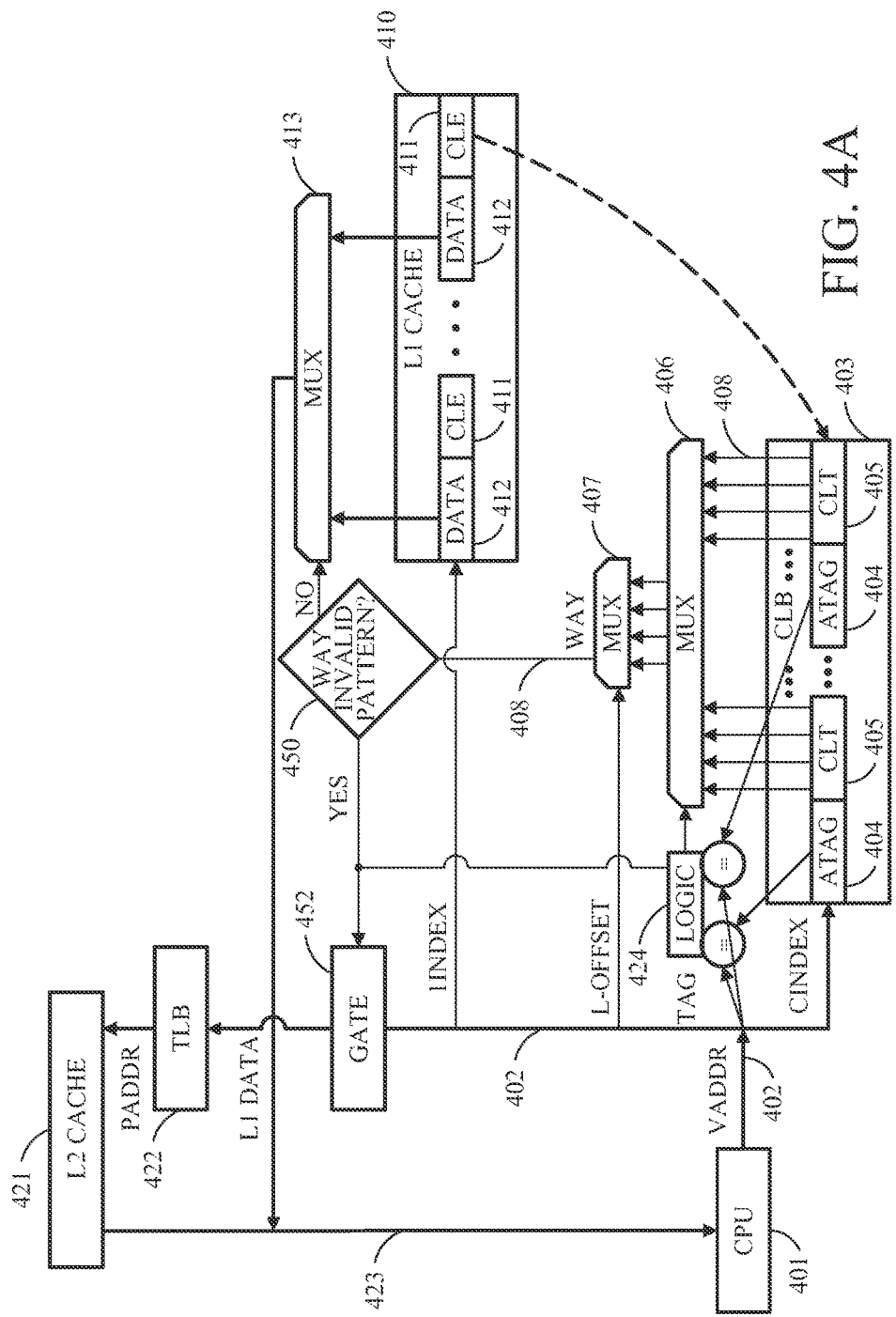
FIG. 4A is a block diagram illustrating an embodiment including a single-level cache hierarchy and a cache location buffer (CLB)

In one embodiment, the data units being tracked correspond to cachelines and the cache that stores those data units is organized in a set-associative manner. FIG. 4(a) illustrates such an embodiment, where a set-associative CLB 403 manages a first-level set-associative cache (L1 CACHE 410) of a memory hierarchy. A virtual address 402 is produced by a CPU 401 as a response to an access request to data residing in a cacheline. The virtual address 402 is divided into CINDEX, TAG and L-OFFSET portions, each portion including a plurality of address bits. The CINDEX portion is used to find the set of the CLB 403 where the location information about the cacheline requested by the CPU 401 resides. FIG. 4 illustrates a 2-way set-associative CLB 403 and the identified set contains two cache table entries (CTE), each with two components: an address tag (ATAG) 404, which stores an address tag, and cache location table (CLT) 405, which stores location information (LI) 408 for a plurality of cachelines. If there is a match between the TAG portion of the virtual address 402 and any of the ATAGs in the set identified by the CINDEX value, then the logic 424 will control MUX 406 to select the CLT corresponding to the matching ATAG. The L-OFFSET portion of the virtual address 402 will control MUX 407 to select the specific location information which corresponds to the cacheline requested by the CPU 401. In this example, the identified location information 408 consists of WAY information for the L1 CACHE 410. A INDEX portion of the virtual address 402 is used to select the set where the requested cacheline resides in the L1 CACHE 410 and the WAY information is used to control MUX 413 to select that cacheline, which is returned via interconnect 423 to the CPU 401.

Figure 3:
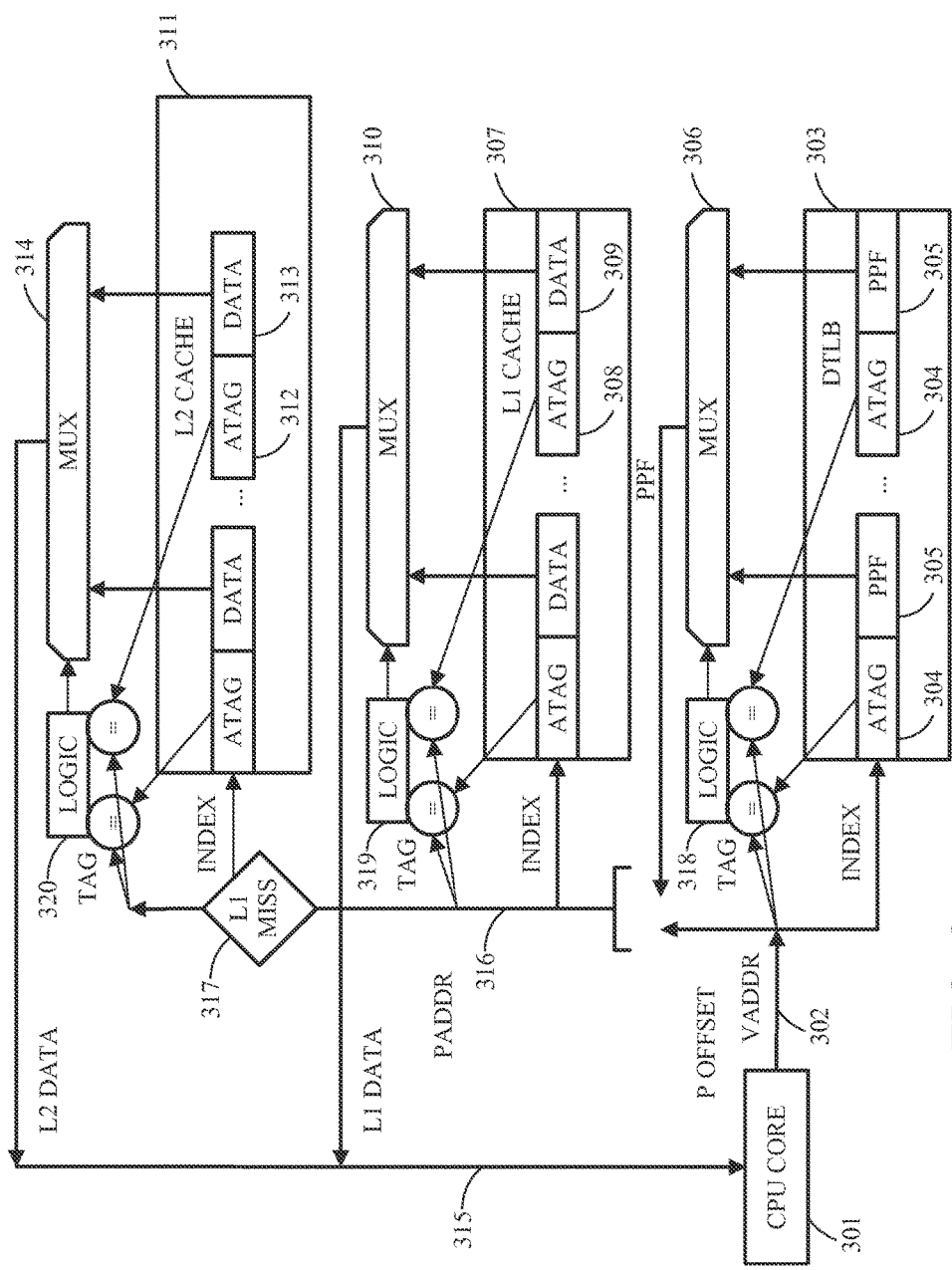
FIG. 3 illustrates a conventional implementation of a two-level cache hierarchy consisting of set-associative caches and a set-associative data translation look-aside buffer.

Note that, unlike the conventional caching system of FIG. 3, the L1 CACHE 410 of the embodiment of FIG. 4 does not store tags and does not perform comparisons between stored tags and a portion of an address to determine whether a cache hit or miss occurs, and instead relies on the CLB 403 to assist in locating cached data that has been requested by a processor.

If the requested cacheline is indicated to not reside in L1 CACHE 410, or if none of the named ATAGs match the TAG portion of the virtual address 402, it can be determined that the requested cacheline does not reside in L1 CACHE 410 and no lookup in that cache is needed. Regarding the latter circumstance, a predetermined bit pattern for the location information, herein referred to as the memory pattern, is here defined to indicate that the requested cacheline does not reside in L1 CACHE 410 and is stored in the corresponding CLT when a cacheline is determined not to be stored in the L1 CACHE 410 so that subsequent accesses to the same cacheline may avoid a cache lookup in cache 410. Instead, when logic 424 or decision block 450 determine that the L1 CACHE 410 does not contain the requested data, then the gate function 452 is triggered to pass the virtual address 402 on as a request to the next level in the cache hierarchy (i.e., L2 CACHE 421, which in this example may be a conventional cache). In FIG. 4(a), L2 CACHE 421 is shown to be physically addressed, which is why a TLB 422 is used to translate the virtual address to a physical address before the L2 CACHE access is started. In one embodiment, L2 CACHE 421 can also be virtually addressed.

In an embodiment, all valid cachelines in L1 CACHE 410 are required to have a corresponding LI in the CLB 403 that does not contain the memory pattern. If none of the ATAGs in the CLB 403 set selected by the CINDEX match the TAG portion of the virtual address 402, it can be determined that CLB 403 does not contain LI for the requested cacheline. Then, one of the CTEs of the selected CLB set is chosen for eviction from the CLB 403 and the cachelines of its CLT 405 that do not already contain the memory pattern are evicted from the L1 CACHE 410. This eviction of cachelines from the L1 cache is referred to as a forced eviction, since it is prompted by a CLT replacement and not by a cacheline allocation in L1. Then, the ATAG 404 of the CTE which has just been evicted is set to match the TAG portion of the virtual address 402 and the location information of the CLT 405 of that CTE are all set to the memory pattern. In one embodiment, CTEs whose CLTs contain more memory patterns are are prioritized to be chosen for eviction over CTEs which store more non-memory-patterns. In an embodiment, the CTE chosen for eviction can be sent to some backing storage and the cachelines associated with that CTE can be kept in the L1 CACHE 410.

In an embodiment, each of the cachelines 412 stored in the L1 CACHE 410 has a CLE pointer 411 ("CLB location entry") associated with it. The CLE pointer 411 stores information to identify the CTE in CLB 403 that stores location information about the associated cacheline 412 in the CLB 403. In an embodiment, the CLE pointer 411 is used when a cacheline 412 is moved from the L1 CACHE 410 to identify the corresponding CTE, and a location offset is used to find the location information LI which corresponds to that cacheline 412 within the corresponding CTE. In this example, INDEX of the L1 cache 410 is identical do the L-OFFSET (location offset). After the correct location information is identified within the CLB 403, then that location information is updated to reflect the new location of the cacheline 412 which has moved. In one embodiment, the location information is changed to the memory pattern when a cacheline is removed from the L1 CACHE 410.

Figure 4B:
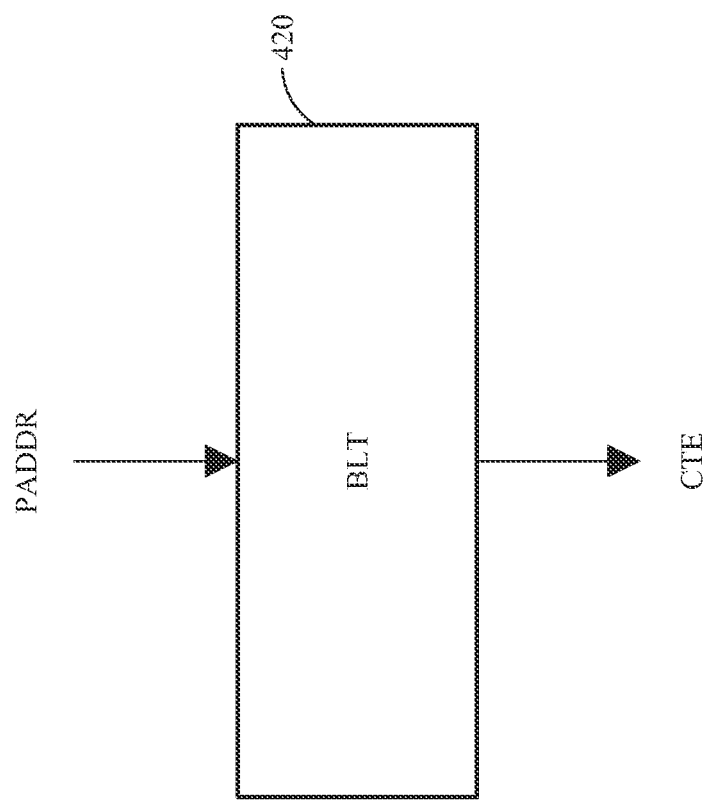
FIG. 4B depicts a translation facility between a physical address and a cache table entry according to an embodiment.

In some embodiments, and referring now to FIG. 4(b), a backwards look-aside table (BLT) 420 can be provided, which is an associative structure that translates a physical address into the identity of the CTE, i.e., the ATAG 404 and CLT 405 combination in CLB 403, which stores the LI for a cacheline corresponding to that physical address. In one embodiment, the BLT 420 contains translations only for cachelines that have an LI entry in the CLB 403 (for clarity: this entry may contain the memory pattern or some way information). If the BLT 420 does not contain an entry for a physical address, it can be determined that neither the CLB 403 nor the L1 CACHE 410 contains the requested cacheline or information associated therewith.

The BLT 420 can be used for a number of different purposes. For example, and in one embodiment, the BLT 420 can be used to find a cacheline to service external requests, such as requests from a coherence protocol. In another embodiment, a BLT lookup is used to detect a phenomenon known as the synonym problem. The synonym problem refers to a situation where a cache which is not physically tagged (such as the L1 CACHE 410 of FIG. 4(a)) may contain two copies of the same cacheline referred to by different virtual addresses. This can create consistency problems known as a synonym problem Before a new CTE is brought into the CLB 403, performing a lookup in the BLT 420 using a physical address corresponding to the CTE will reveal if there already is a CTE in the CLB 403 covering that physical address, which would imply that a synonym may already reside in the L1 CACHE 410. In one embodiment, the CTE existing in the CLB 403 that is associated with the identified synonym, and all its corresponding cachelines, are evicted from the L1 CACHE 410 before the new CTE is put in the CLB 403. In one embodiment, the synonym CTE is evicted, the new CTE is put into the CLB 403 and the values of the synonym CTE's LIs are copied to the new CTE's LIs, but no cachelines are evicted from L1 410.

Figure 5A:
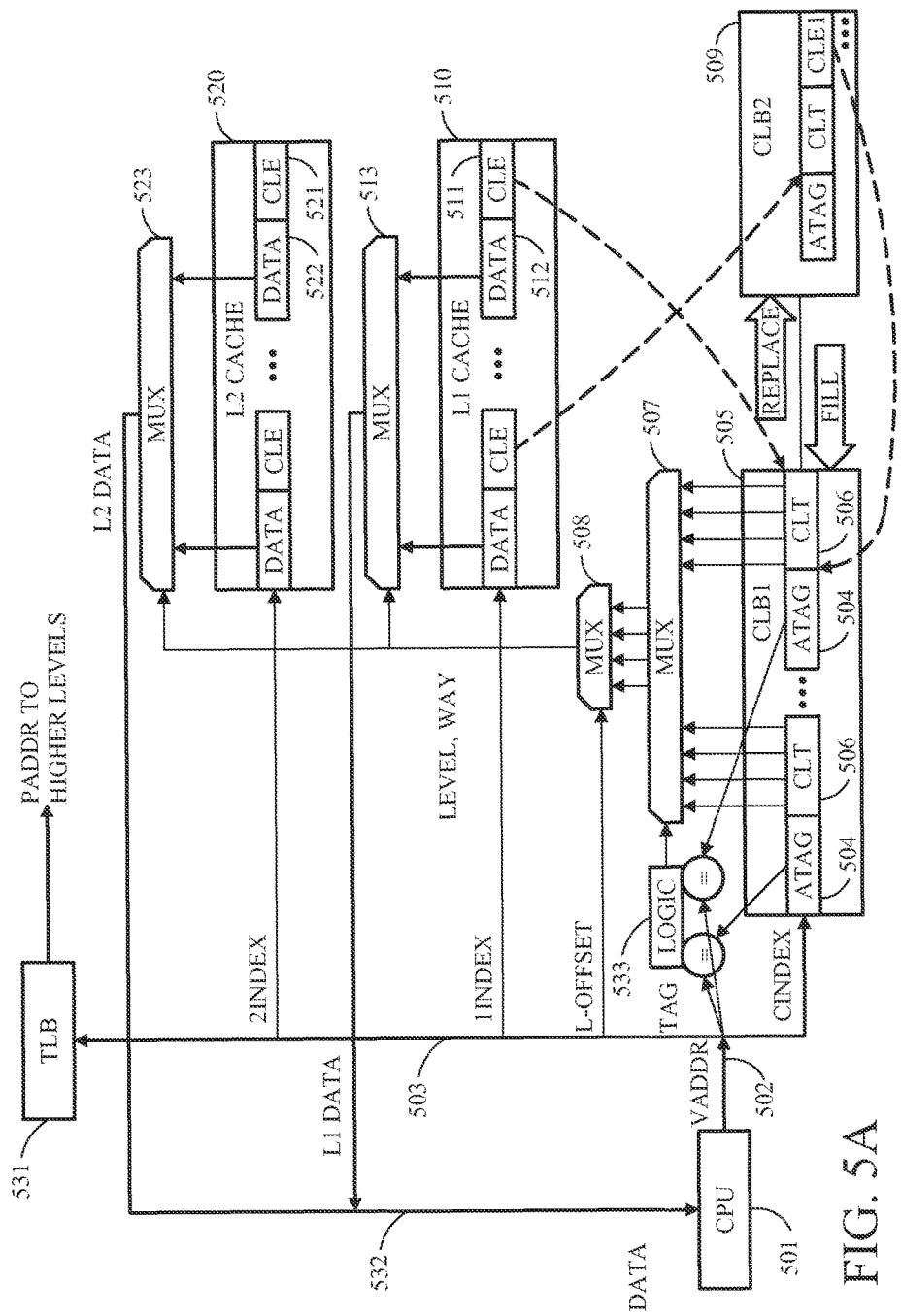
FIG. 5A is a block diagram illustrating an embodiment including a two-level cache hierarchy and a two-level CLB hierarchy.

Turning now to another embodiment, FIG. 5(a) shows a two-level virtual cache hierarchy with an L1 CACHE 510 and an L2 CACHE 520, both being set-associative caches. Requests for higher-level physically addressed caches (level 3 or higher), or to the main memory of the system, are sent to TLB 531, which performs the address calculation and sends the request to the higher levels together with the physical address.

The lookup in the CLB1 505 is performed in a similar way to the lookup in CLB 403 of FIG. 4(a). Thus, for example, CPU 501, upon receiving a request for a particular chunk of data, e.g., a cacheline, from an application being executed thereon, issues a virtual address request 502 for that cacheline. The virtual address 502 includes a number of portions or fields, three of which are used in this embodiment to check the CLB1 505 for location information associated with the requested cacheline. Specifically, the CINDEX portion of the virtual address 502 is used to select the corresponding set in the CLB 503, the TAG portion of the virtual address 502 is used to compare with ATAGs 504 in the identified set to identify a particular CLT 505 which includes the desired location information via logic 533 and MUX 507 and the L-OFFSET portion of the virtual address 502 is used to select a particular part of the CLT 506 which is associated with the requested cacheline via MUX 508.

However, in this FIG. 5(a) example, the location information for the requested cacheline selected by the MUX 507 and 508 contains information about a cache level where the requested data resides (in this example LEVEL information) as well as a physical location of the requested cacheline within that cache (in this example WAY information). If the requested cacheline does not reside in any of the two cache levels, the location information contains a memory pattern, with the interpretation that the requested cacheline does not exist in the part of the cache hierarchy covered by the corresponding CHS.

In one embodiment, the cache level information output from MUX 508 is utilized to make the cache lookup selective, i.e., only performed in the cache of the identified level. For example, if the level information identifies Level 1 CACHE 510 as having the requested cacheline, a lookup is neither performed in the L2 CACHE 520, nor in any of the higher cache levels (including memory). Thus, in this example, a lookup would be performed in the L1 cache 510 by using the 1INDEX portion of the virtual address 502 to select a set within the cache 510, and using the WAY information output from MUX 508 as a selection input to MUX 513 to select the DATA 512 associated with the requested cacheline for return to CPU 501 via bus 532. Alternatively, if the LEVEL information indicates that the requested cacheline is resident in L2 cache 520, then a similar lookup is performed in that cache using the 2INDEX portion of the virtual address and MUX 523 to output the appropriate DATA 522 as the requested cacheline to bus 532.

On the other hand, if the location information associated with the requested cacheline contains the memory pattern, then it is determined that the requested cacheline neither resides in L1 cache 510 nor in L2 CACHE 520 and subsequently cache lookup may not be performed in either of them. Instead, a request to the higher levels is sent off immediately via TLB 531.

FIG. 5(a) also depicts an embodiment wherein a CTE that is replaced (evicted) from the CLB1 505 can be stored in CLB2 509. When a new request is later made for that particular CTE, it could be re-installed (filled) from the CLB2 509 into the CLB1 505. In this embodiment, the CLE pointers 511 and 521 are updated to track the current CTE's location and may point to a location in CLB1 505 or CLB2 509. When data is moved in the cache hierarchy, its corresponding location information in its corresponding CTE is updated. The CLE pointer 511 and CLE1 pointer in CLB2 point to the CTE in CLB1 505 that contains the active location information which corresponds to data stored in the L1 cache 510.

Figure 5B:
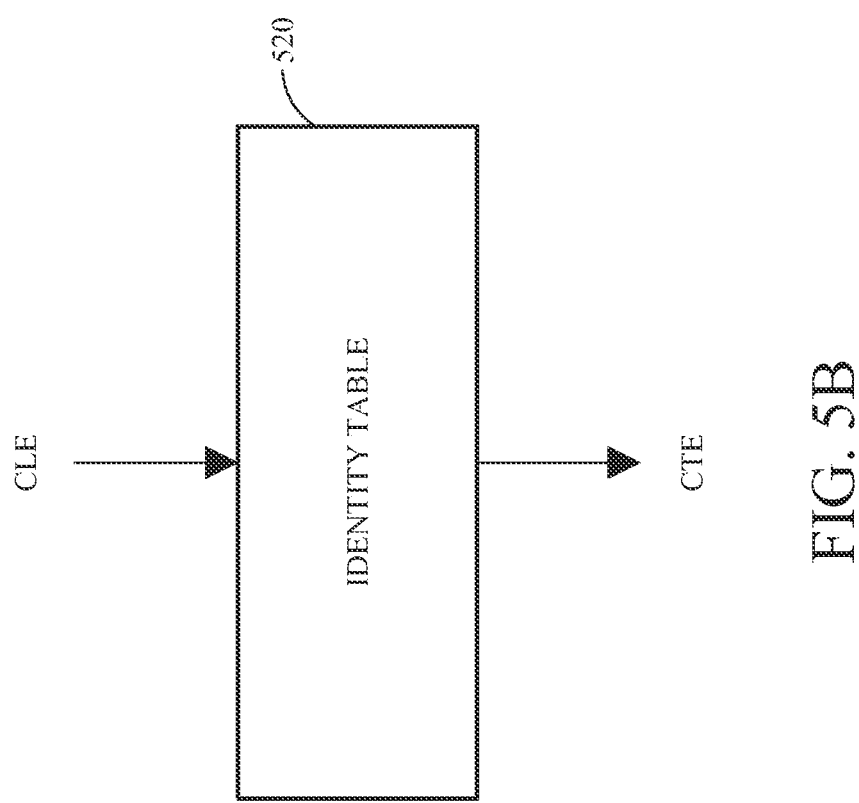
FIG. 5B illustrates a translation facility between a physical address and a cache table entry according to an embodiment.

In one embodiment, the system of FIG. 5(*a*) can also include an additional indirection table shown in FIG. 5(*b*) to track the association between a cached cacheline and its associated CTE. When a CTE is moved, only the associated entry in the indirection table needs to be moved. This indirection table can, for example, be leveraged when a CTE is moved between CLB levels (for example between CLB1 505 and CLB level 509 of FIG. 5) or when a synonym has been detected.

Figure 6:
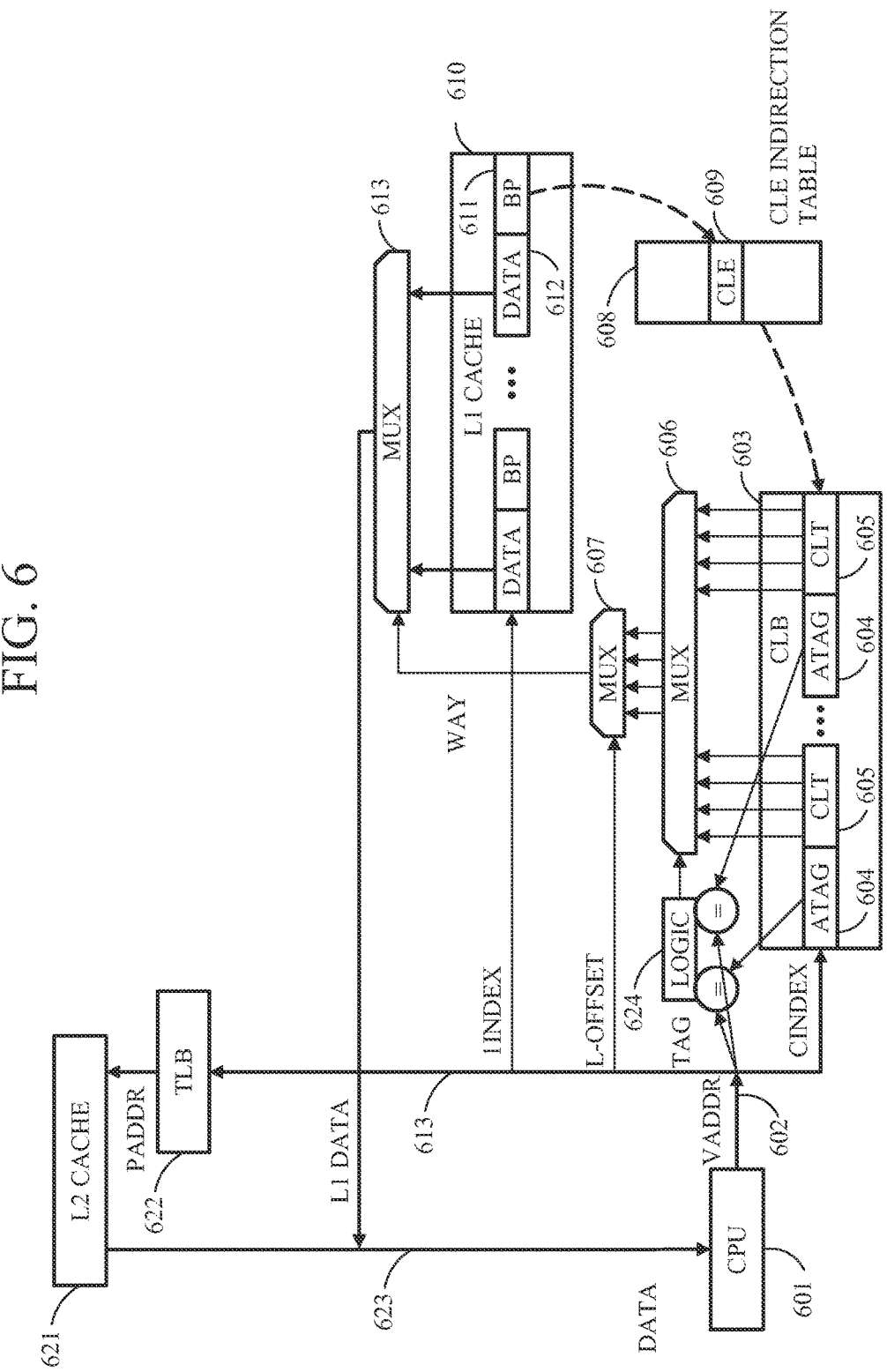
FIG. 6 is a block diagram illustrating an embodiment including a single-level cache hierarchy, a CLB and one extra indirection table for associating cache lines with cache table entries (CTEs)

FIG. 6 shows an embodiment similar to FIG. 4(*a*), but extended with an additional CLE indirection table 608. Therein, like reference numerals refer to like elements with similar functions to those found in FIG. 4(*a*) and described above (e.g., MUX 606 performs the same function as MUX 506) and thus their description will not be repeated here, except for elements whose function differ as follows. For example, the CLE pointer 411 of FIG. 4(*a*) has been replaced by a backwards pointer (BP) 611, pointing to one entry of the CLE indirection table 608. Each entry in CLE indirection table 608 stores a pointer to a CTE. For example, the cacheline 612 has an associated BP 611 pointing to the CTE entry 609 of CLE indirection table 608. The CLE entry 609 is pointing to the CTE, consisting of ATAG 604 and CLT 605, that is associated with cacheline 612.

In one embodiment, the existence of a CLE indirection table 608 is leveraged to make the handling of synonyms more efficient. Once a BLT lookup has detected that a new CTE that is about to be installed in the CLB 603 has a synonym entry already installed in the CLB 603, the CLE pointer 609 of the CLE indirection table pointing to the synonym is changed to instead point to the new CTE, and the contents of the CLT of the synonym is copied to the CLT of the new CTE and, finally, the synonym CTE is removed. In this embodiment, no cachelines of the L1 CACHE 610 need to be evicted nor will any of their backwards pointers BP 611 need to be changed.

In one embodiment with more than one CLB level and a CLE indirection table, a movement of a CTE from one CLB level to another CLB level (for example an eviction of a CTE from CLB1 to CLB2) only implies that the corresponding entry of CLE INDIRECTION TABLE pointing to the old CLE location need to be changed to point to the new CTE location and that none of the backwards pointers BP (or CLT pointers for a multi-level cache system) in the cache, or caches, need to be changed.

The number of cachelines whose location information resides in a single CLT may in some implementations correspond to the number of cachelines of a page of the architecture. For example, in an architecture with 4 kbyte pages and 64 byte cachelines, the CLT may contain 64 location information (LI) entries covering the 64 cachelines of a page. In another implementation, a CLT may contain fewer LI entries than the number of cachelines of a page. For example, the CLT may contain only 16 LIs covering only one quarter of a page in the above example. This is referred to as a micropage. This implies that four different CLB micropage entries are needed to cover all the cachelines of a page. Virtual address bits can be used to determine which of these four micropages a specific cacheline belongs to. The number of location information (LI) entries contained in an CLT may be different for different CLB levels.

In one embodiment a plurality of banks, each containing one CLB and one or more levels of caches, is formed. The CTEs and the cachelines are divided between the banks in such a way that CTEs associated with each cacheline resides in the same bank as the cacheline and that a portion of the address used to access a cacheline can determine in which bank that cacheline resides. In one implementation there are four such banks and the CLT of each CLB contains location information for one quarter of the cachelines of a page for that architecture. In one embodiment, micropages are stored in the CLB which facilitates the co-location of cachelines and their corresponding CLE in the same bank.

Figure 7:
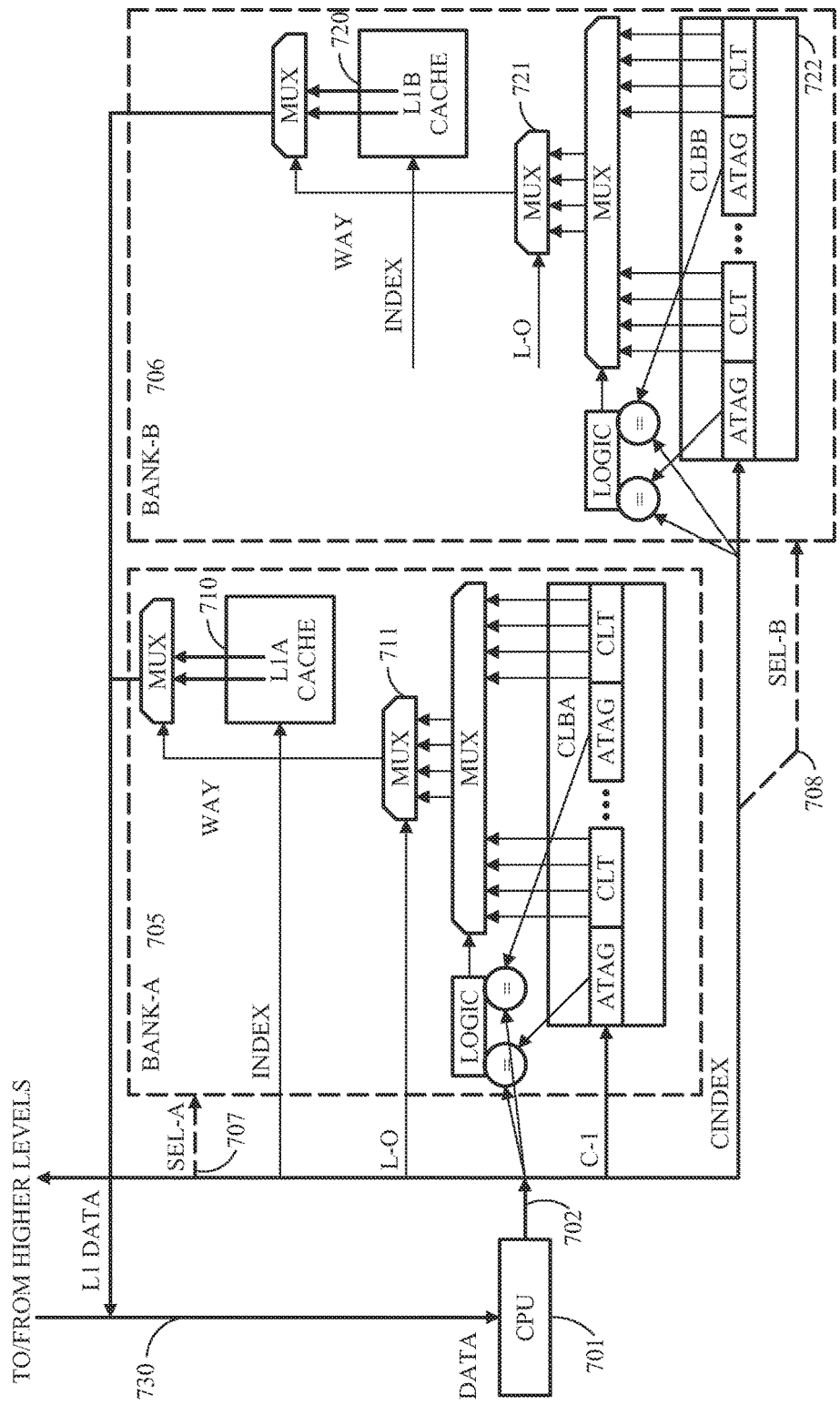
FIG. 7 is a block diagram illustrating an embodiment including a single-level cache hierarchy and a CLB, where the cache and CLB implementation is banked.

FIG. 7 shows an example of such a banked embodiment. Therein, like reference numerals refer to like elements with similar functions to those found in FIG. 4(*a*) and described above (e.g., arrow 702 refers to a virtual address much like reference 402 in FIG. 4(*a*)) and thus their description will not be repeated here, except for elements whose function differ as follows. Additionally, some common elements (e.g., MUXs and logic elements) are not referred to by specific reference number in FIG. 7 as they have been repeatedly discussed in the earlier embodiments. However, BANK-A 705 contains L1A CACHE 710, CLBA 712 and elements functionality associated with those storage devices, such as MUX 711. BANK-B 706 contains L1B CACHE 720, CLBB 722 and functionality associated with those storage devices, such as MUX 721. CLBA 712 and CLBB 722 have their CLT entries organized in micropages. A portion of the address bits from virtual address 702 is used to form a selection signal SEL-A 707, selecting BANK-A, and a portion of the address bits 702 is used to form a selection signal SEL-B 708, selecting BANK-B.

In one embodiment, only a selected bank will perform a cache lookup in its caches. In one embodiment, some of the signals sent to a bank, such as INDEX signals and other portions of the address 702, are not sent to a bank unless it is selected. In one embodiment, a plurality of banks can be accessed in parallel using separate CPU ports. This allows a plurality of memory accesses, which have been determined to be to different banks, to be performed in parallel.

Figure 8:
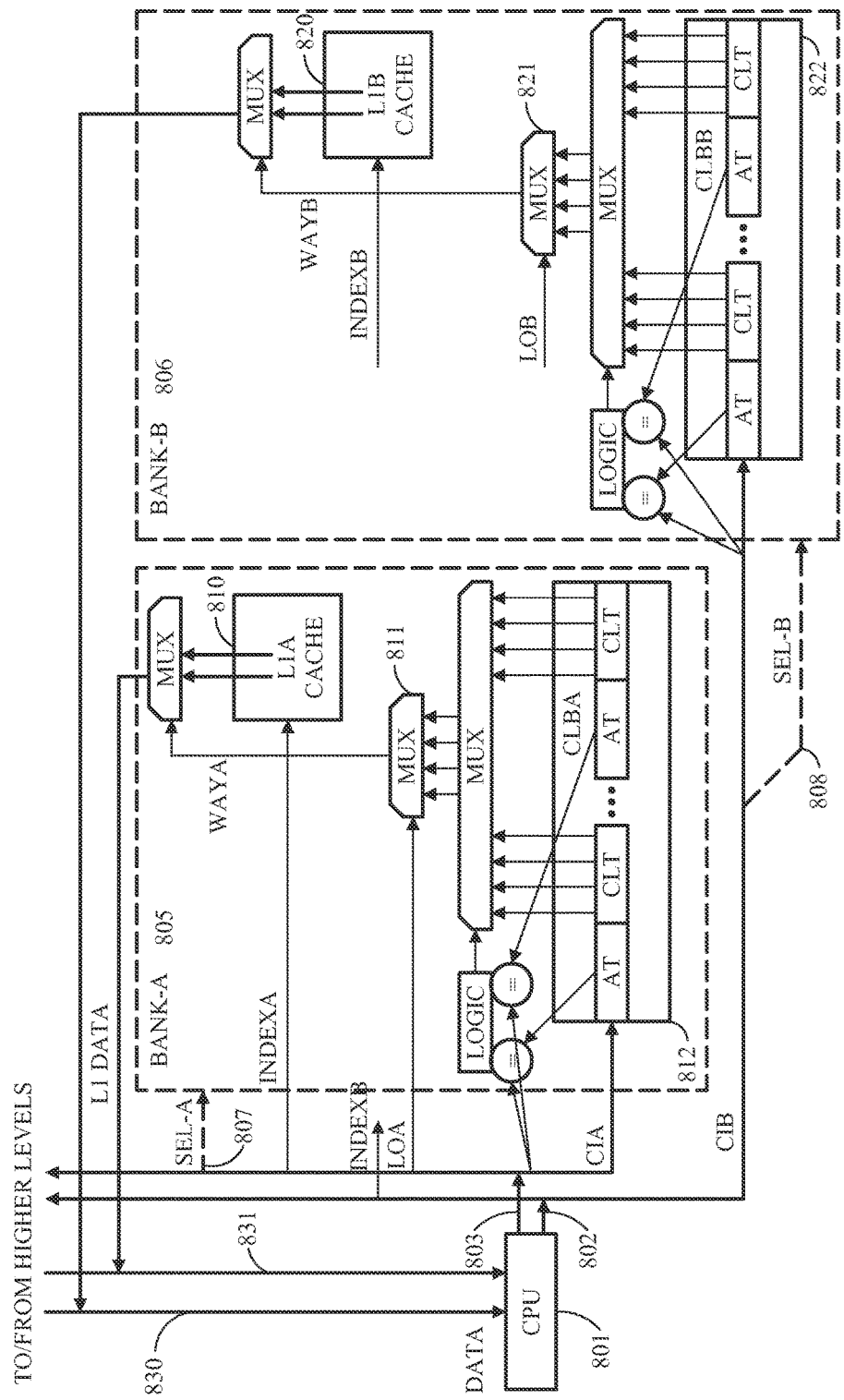
FIG. 8 is a block diagram illustrating an embodiment including a single-level cache hierarchy and a CLB, where the cache and CLB implementation is banked to allow for multi-ported access.

For example, FIG. 8 shows an embodiment with two banks, BANK-A 805 and BANK-B 806 connected to their own separate CPU ports 803 and 802, respectively. Some common elements with respect to previous embodiments (e.g., MUXs and logic elements) are not referred to by specific reference number in FIG. 8 as they have been repeatedly discussed in the earlier embodiments. Each CPU port 802 and 803 thus issue their own request for data as different virtual addresses. Each of these virtual addresses are parsed into their respective fields (CIndexData (with bank selection indicator), TAG field, L-Offset, and INDEX) for processing as described above to access the requested cachelines. For example, CLBA 812 will operate, based at least in part on reception of a valid selection signal 807 into BANK A, to output various location information to the MUX connected thereto, from which location information associated with the requested cacheline will be further selected by MUX 811 for retrieval from L1A cache 810 in the manner previously described. The BANK-B operation will be similar using CLBB 82, MUX 821 and L1B cache 820. The data associated with these requested cachelines from the two BANKs are returned on two separate data ports, 831 and 830, respectively.

In one embodiment, caches of different levels covered by one or many CLB levels may be accessed using different address types. For example, one level may be accessed using virtual addresses and another level may be accessed using physical addresses.

Figure 9:
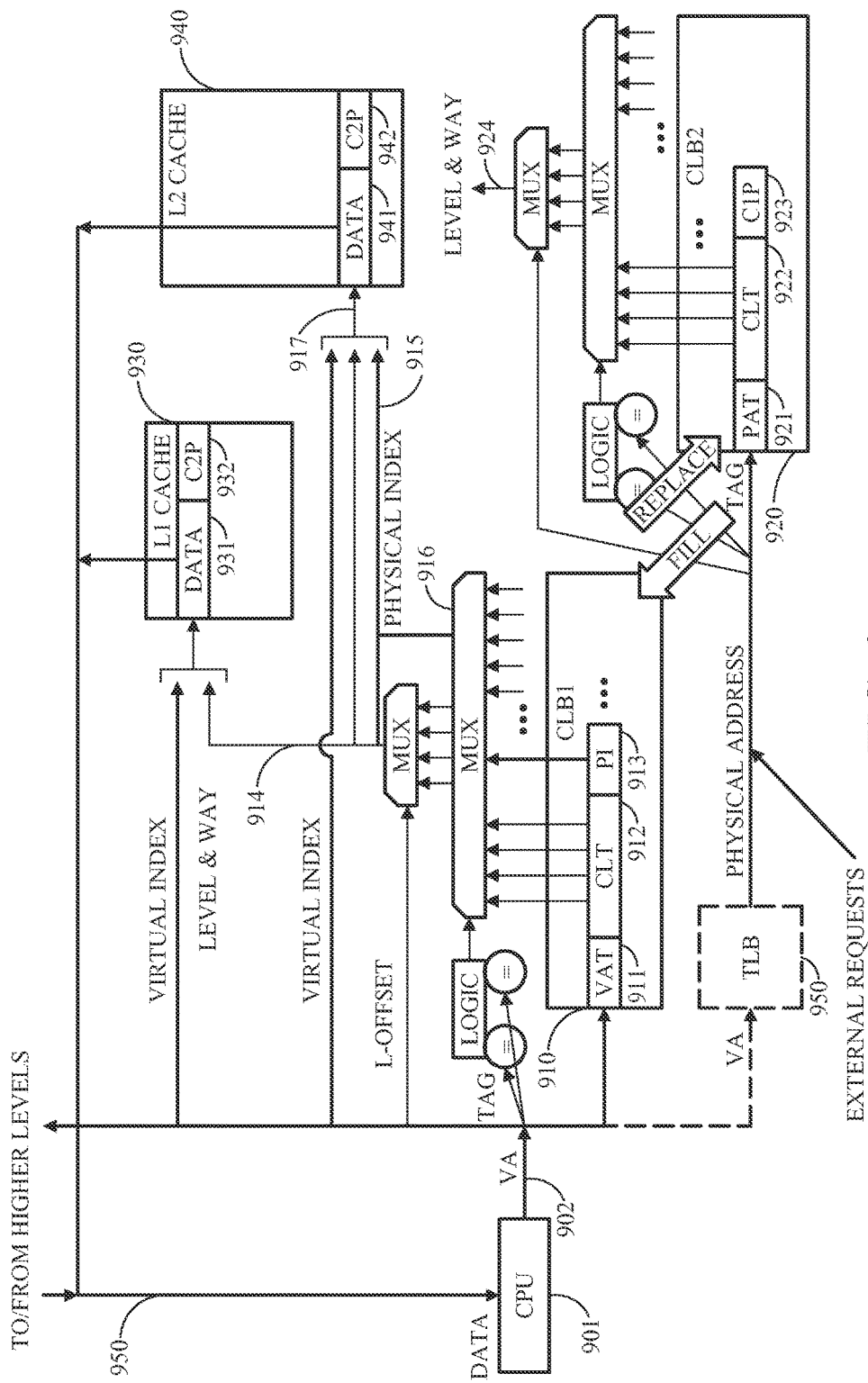
FIG. 9 is a block diagram illustrating an embodiment including a two-level cache hierarchy and a two-level CLB hierarchy, where the first level is virtually accessed and the second level is physically accessed.

To illustrate the usage of different address types, FIG. 9 shows a two-level cache hierarchy of set-associative caches, where CPU 901 generates virtual addresses (VA) 902, L1 cache 930 is accessed using virtual addresses and L2 cache 940 is accessed using physical addresses according to an embodiment. FIG. 9 also shows a two-level CLB hierarchy of set-associative CLBs, where CLB1 910 is accessed using virtual addresses and CLB2 920 is accessed using physical addresses. Each CTE in CLB1 consists of a virtual address tag (VAT) 911, a CLT 912 and a physical index (PI) 913. MUX 916 selects the CLT as well as the PI 915 of the matching CTE. An index 917 for L2 CACHE 940 is formed using the selected PI 915, a VIRTUAL INDEX portion of the virtual address 902 and a portion of the location information 914 associated with the accessed cacheline. In the example of a set-associative L2 CACHE 940, that portion corresponds to the WAY information. An index for L1 CACHE 930 is formed using the VIRTUAL INDEX portion of the virtual address 902 in combination with the selected location information.

For clarity, it should be noted that FIG. 9 shows an alternative representation of the selection functionality of the MUXes placed above the L1 CACHE and L2 CACHE of FIGS. 4-8. More specifically, in FIG. 9, the selection functionality is implemented by including the WAY information in the index selecting the information to read out from the respective cache. A similar solution would be applicable to all of the previous embodiments.

FIG. 9 shows each entry in the L1 cache 930 and L2 cache 940 to have a CLB2 POINTER (C2P), 932 and 942 respectively, associated with its cacheline. (DATA), 931 and 941 respectively. The C2P pointers point to respective associated CTE in CLB2 920. Each CTE in CLB2 920 contains a physical address tag (PAT) 921, a CLT 922 and a CLB1 Pointer (C1P) 923. If the CLB2 entry has a corresponding CLT residing the CLB1 910, its C1P will point to that entry.

In one embodiment, when no matching CTE can be found in CLB1 910, a corresponding CTE is looked for in CLB2 920. FIG. 9 shows how the virtual address 902 generated by CPU 901 is translated to a physical address through a lookup in a TLB 950. The physical address is used to generate Index, Tag and Location portions used in the CLB2 920 lookup. If a corresponding entry exists in CLB2 920, the CLT 922 of that entry is copied to a new CLT entry in CLB1 910 with its VAT and PI portions set to appropriate portions of the virtual and physical addresses, respectively. The corresponding entry in CLB2 920 has its CLB1 Pointer (C1P) 923 set to point to the new entry in CLB1.

In one embodiment, if no corresponding entry in CLB2 920 is found, a new CLB1 entry is formed with all entries in its CLT set to the memory pattern and its VAT and PI portions set to appropriate portions of the virtual and physical Addresses respectively. Similarly, a new entry is formed in CLB2 920 with its C1P 923 pointing to the new CLT entry formed in CLB1 910.

In one embodiment, if the lookup in CLB2 920 caused by a lookup miss in CLB1 finds an entry in CLB2 with a valid C1P value, the CLB1 entry pointed to by the C1P is determined to be a synonym for the CLB1 entry needed. A new CLB1 entry is created, the CLT from the synonym CLB1 entry is copied to its CLT and its VAT and PI portions set to appropriate portions of the virtual and physical addresses respectively, and the C1P portion of the corresponding CLB2 entry is set to point to the new CLB1 entry. The synonym CLB1 entry will not be used anymore and can now be reused. That way, only one synonym is allowed to exist in the CLB1 at any given point in time.

In one embodiment, the location information corresponding to a requested cacheline of a matching CTE can indicate in which level the requested cacheline resides. This will cause embodiments to perform a direct cache lookup at the appropriate level without the need to perform any other lookups. For example, in the system shown in FIG. 9, the location information can distinguish between level one (L1 CACHE), level 2 (L2 CACHE) and HIGHER LEVELS (any cache of level 3 or higher, or the memory). A cacheline in HIGHER LEVELS has its location information set to the memory pattern.

In one embodiment, the contents of the CLBs of a multi-level CLB implementation are kept consistent with the location of the cachelines of the multi-level cache system they manage. A cacheline that is moved in the cache hierarchy, including but not limited to requests for it from the CPU, evictions, prefetching activities and coherence activities, cause an update to its corresponding location information in one or many of the CLBs. For example, in FIG. 9, updating a cacheline's corresponding location information can involve the steps of following its associated C2P pointer to find its corresponding CTE in the CLB2 920 and updating its corresponding location information. And, if the C1P pointer of the corresponding CLB2's CLE is valid, following the C1P to find its corresponding CTE in the CLB1 910 and updating its location information associated with the cacheline. In one embodiment, the entry in the CLB2 is not updated if there is a valid C1P pointer.

In one embodiment, requests from other subsystems, such as requests related to a coherence protocols, can perform a CLB2 lookup to determine if a cacheline associated with the request may reside in the either of the cache levels of the cache hierarchy it covers. If there is no entry in the CLB2 920 which is associated with the address of the external request, it can be determined that the requested cacheline does not reside in the either of the cache levels covered by the CLB2 920. If there is no entry in CLB2 920, it can be determined that the corresponding cacheline can not reside in neither the L1 nor the L2 cache, and that no further activity is required to fulfill the coherence request. This is referred to coherence filtering.

From these examples it can be appreciated that some of the features provided by the BLT according to previous descriptions can instead be provided by a physically tagged CLB2 containing a C1P pointer associated with each CLT entry. Likewise, some of the features previously solved by the CLE indirection table can also be solved by a CLB2 containing C1P pointers.

As will be appreciated from the foregoing, using tag-less cache systems according to these embodiments will result in a number of different types of transactions which will occur when various cachelines located in different storage devices are requested by a CPU 901. It will be appreciated by those skilled in the art that the choice of coherence protocol to be used in a data processing system is not determined by, and is orthogonal to, the techniques for locating cachelines described in these embodiments. The coherence protocol used in these embodiments may be a so-called snooping broadcast protocol or a directory-based protocol. While a broadcast protocol often sends its external coherence requests to all its cache sub-systems caches, a directory-based coherence is more selective and keeps track of which sub-system caches may have cached copies and only sends its coherence request to those subsystem. A directory-based coherence protocol has a directory to help track which cache sub-systems may have a cached copy of each cache line. While such a directory keeps track of cache sub-systems with cached copies of a cacheline, the location information described in these embodiments instead tracks the cache location information that, for example, can identify the cache level and way. The coherence protocol can leverage this cache location information to find the location of a requested cache line within a targeted cache sub-system. Unlike the directory information stored by a directory based coherence protocol, however, the cache location information provided in these embodiments will also help a CPU access to find the location of a requested cacheline.

For example, the system depicted in FIG. 9 may be a cache subsystem in a larger system comprised of several such cache sub systems implementing either snooping or directory-based coherence. If such a sub-system implements directory-based coherence, then it will also include a directory table (not shown in FIG. 9) in addition to the CLBs 910 and 920. In such a system, each cacheline in the L2 cache and the L1 cache will have some state information associated with them (also not shown in FIG. 9). This state information can, for example, be stored in such a manner that it is associated with each cacheline in the L2 CACHE and L1 CACHE, or it could be stored in a manner such that it is associated with the location information in the corresponding CLT.

The coherence system will send coherence requests to the depicted cache subsystem in FIG. 9. These requests will first turn to CLB2 920, which may determine that this cache system does not have the requested cacheline (CLB2 miss or a CLB2 hit to an entry with an inactive C1P and the location information of the requested cacheline holding the value memory pattern). If so, no further action is needed, and this is known as coherence filtering. Otherwise, it may contain the requested location information (CLB2 hit and the location information of the requested cacheline holding storing the location of the cacheline), or it may determine that CLB1 910 stores the associated location information (CLB2 hit and a valid C1P). In the latter case, a lookup in CLB1 910 is needed to determine either the location of the requested cacheline or that the cacheline does not reside in this cache sub-system. (The corresponding location information in CLB1 contains a memory pattern). Depending on the nature of the coherence request, for example an invalidate, a read request, or an exclusive read request, the coherence protocol may perform some operations on the requested cacheline and possibly change its state. However, the exact functionality of that operation and the state changes required is not determined by these embodiments.

As a further illustrative example, and in order to describe the embodiments in a transactional/method manner rather than a structural manner, a number of such transactions are described below using the structural embodiment of FIG. 9, although the present invention is not limited thereto.

CLB1 Hit and L1 CACHE Hit:
  1. CLB hit: One of the indexed CLEs in CLB1 has a VAT corresponding to the TAG portion of the VA.
  2. L1 hit: The Location Information of named CLE that corresponds to the requested Cacheline identifies the L1 CACHE level as the location for the requested Cacheline.
  3. L1 ACCESS: The L1 CACHE is accessed using the INDEX portion of the VA and WAY information from named Location Information.
  4. Return data: The data read from the L1 CACHE is sent to the CPU CLB1 Hit and L2 CACHE Hit:
  1. CLB hit: One of the indexed CLEs in CLB1 has a VAT corresponding to the TAG portion of the VA.
  2. L2 hit: The Location Information of named CLE that corresponds to the requested Cacheline identifies the L2 CACHE level as the location for the requested Cacheline.
  3. L2 ACCESS: The L2 CACHE is accessed using a VIRTUAL INDEX portion of the virtual address VA, the PI of named CLE and the WAY information from named Location Information.
  4. Return data: The data read from the L2 CACHE is sent to the CPU
  5. Data to L1 CACHE (optional):
    a. An appropriate location in L1 CACHE is identified (possible through an L1 eviction)
    b. Named Cacheline is move to this appropriate L1 CACHE location
    c. Named Location Information is changed to reflect this move.

CLB1 Hit and Cache Miss:
  1. CLB hit: One of the indexed CLEs in CLB1 has a VAT corresponding to the TAG portion of the VA.
  2. Cache miss: The Location Information of the matching CLE that corresponds to the requested Cacheline contains the memory pattern.
  3. Data read: The requested cacheline is read from the Memory (or higher level caches) and sent to the CPU. In this example, the physical index bits (PI) have enough information for the Physical Address to be composed. In another example, part of the physical address produced by the TLB 950 may be used.
  4. Data to L1 CACHE:
    a. An appropriate location in L1 CACHE is identified (possible through an L1 eviction)
    b. Named Cacheline is move to this appropriate L1 CACHE location
    c. Named Location Information is changed to reflect this move.

L1 Eviction, CLB1/CLB2 Update
  1. L1 eviction: A Cacheline is selected to be evicted from the L1 CACHE
  2. L2 CACHE update: A new appropriate location for it is identified in the L2 CACHE, possible causing a L2 CACHE eviction, and the Cacheline is moved to this location
  3. CLB tracking: The C2P field of the selected Cacheline is used to find the corresponding CLB2 CLE entry. If its C1P is valid, it is used to find the corresponding entry in CLB1 and update it to reflect the Cacheline move. If its C1P is not valid, the corresponding CLB2 entry is updated to reflect this move.

The embodiments can also be applied on systems with several CPUs sharing a cache managed by the CLBs. In one embodiment, the CLB2 entry is extended with one C1P pointer corresponding to each of the CPUs sharing the cache.

Figure 10:
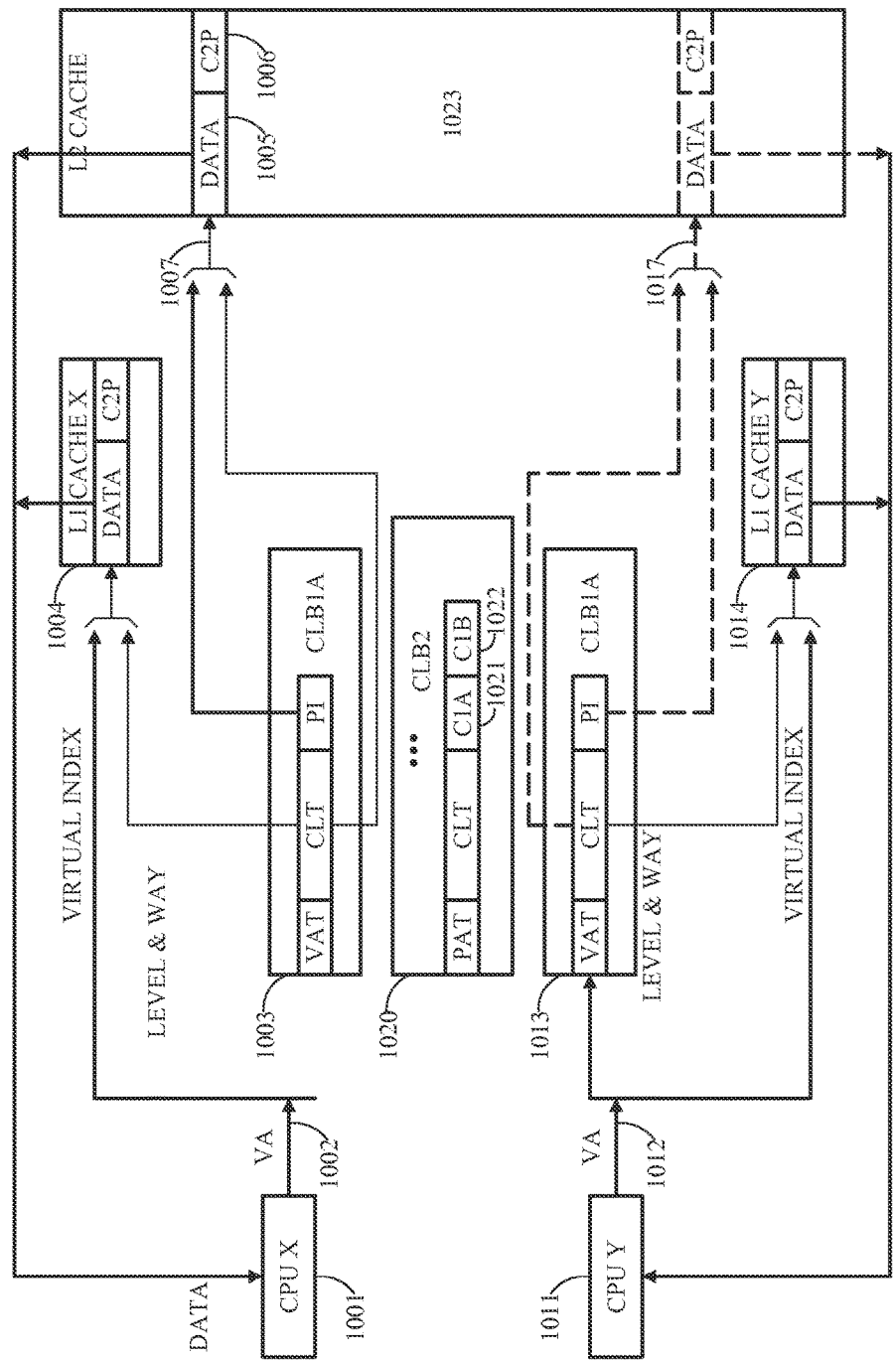
FIG. 10 is a block diagram illustrating an embodiment including two CPUs connected to a two-level cache hierarchy and a two-level CLB hierarchy.

For example, FIG. 10 shows a system built from two CPUs (1001 and 1011) each with their own CLB1 (1003 and 1013) and their own L1 CACHE (1004 and 1014) according to an embodiment. The system also contains a CLB2 1020, and an L2 CACHE 1023 which are shared between the two CPUs 1001, 1011. The CLB2 1020 has been extended to store two CLB1 entry pointers (CIA 1021 and CIB 1022), one for each CLB1 of respective CPU. If there is a valid CLB1 entry in any or both CLB1s, the pointer corresponding to the respective CLB1 will contain a valid pointer identifying the corresponding CLB1 entry.

In one embodiment, for CLB2 entries that have both CLB1 pointers valid, each corresponding CLB1's CTE is responsible for tracking the location of the corresponding cachelines in its L1 CACHE. In one embodiment, the number of CLB1 pointers associated with each CLB2 entry corresponds to the number of CLB1s sharing that CLB2.

From the foregoing embodiments, various general features of the embodiments can be noted. These features can be used together in some embodiments, or in various combinations and subcombinations in other embodiments. For example, a cache location buffer (CLB) is used to track the location of cache lines in a cache hierarchy. The cache hierarchy may include one or many caches of different sizes and/or access times. Each cache can store a plurality of cache lines stored in an associative way, for example, divided into a number of sets, each containing a number of ways. While the address identifying a cache line can be used to identify a set within a cache where the cache line should reside, the identity of its way location cannot be determined by its address without a search.

One task of the CLB according to some embodiments is to efficiently find the cache level and the location within that cache level which stores a specific cache line, or to efficiently determine that the cache line does not reside in the cache hierarchy at all. In this context, "efficiently" may refer to using less energy, operating more quickly, using less storage space, some combination thereof, or other beneficial results.

A CLB may be implemented according to some embodiments as an associative structure, storing a plurality of cache table entries (CTE). Each such entry stores, for example, an address tag and location information for the group of cache lines that are identifies by that CTE. The CLB may be implemented in a hierarchical manner with smaller and faster CLBs backed by larger but slower CLBs. The different CLB levels can be designed to be accessed using virtual or physical addresses.

The location of a requested cache line is determined by a lookup in the CLB, after which the cache line can be accessed at its determined level and location without the need for any other associative lookups. This removes the requirement to store additional address tags in the cache hierarchy.

Numerous variations and permutations of the above embodiments are contemplated. For example, in one embodiment the number of location information bits associated with a CTE may be different for different CLB levels and the copying of LI information between the CLB levels may be partial copying operations. In another embodiment, the functionality of a first-level CLB is integrated with the functionality of a TLB or contains parts of the functionality commonly found in TLBs. In an example of such an implementation, a CLB entry could contain some combination of virtual address tag (VAT), cache location table (CLT), access permission encodings and physical address translation, as well as other metadata commonly found in TLB implementations. Moreover, even though the examples above contain up to two cache levels and up to two CLB levels, those skilled in the art will understand that the techniques described herein can be generalized to apply to more levels of caches and more levels of CLB, e.g., as described below with respect to the embodiment of FIG. 15. There is no requirement that the number of cache levels and the number of CLB levels are the same. It will also be understood that the last level of CLB may spill and fill to a dedicated region in traditional (main) memory and that way act as a CLB cache.

In one embodiment, the information of a CTE may contain other metadata associated with its associated cachelines, including but not limited to, information about their access patterns and past usage, cacheline state, protection information normally stored in a TLB and the physical address portion needed to generate a physical address.

Figure 11:
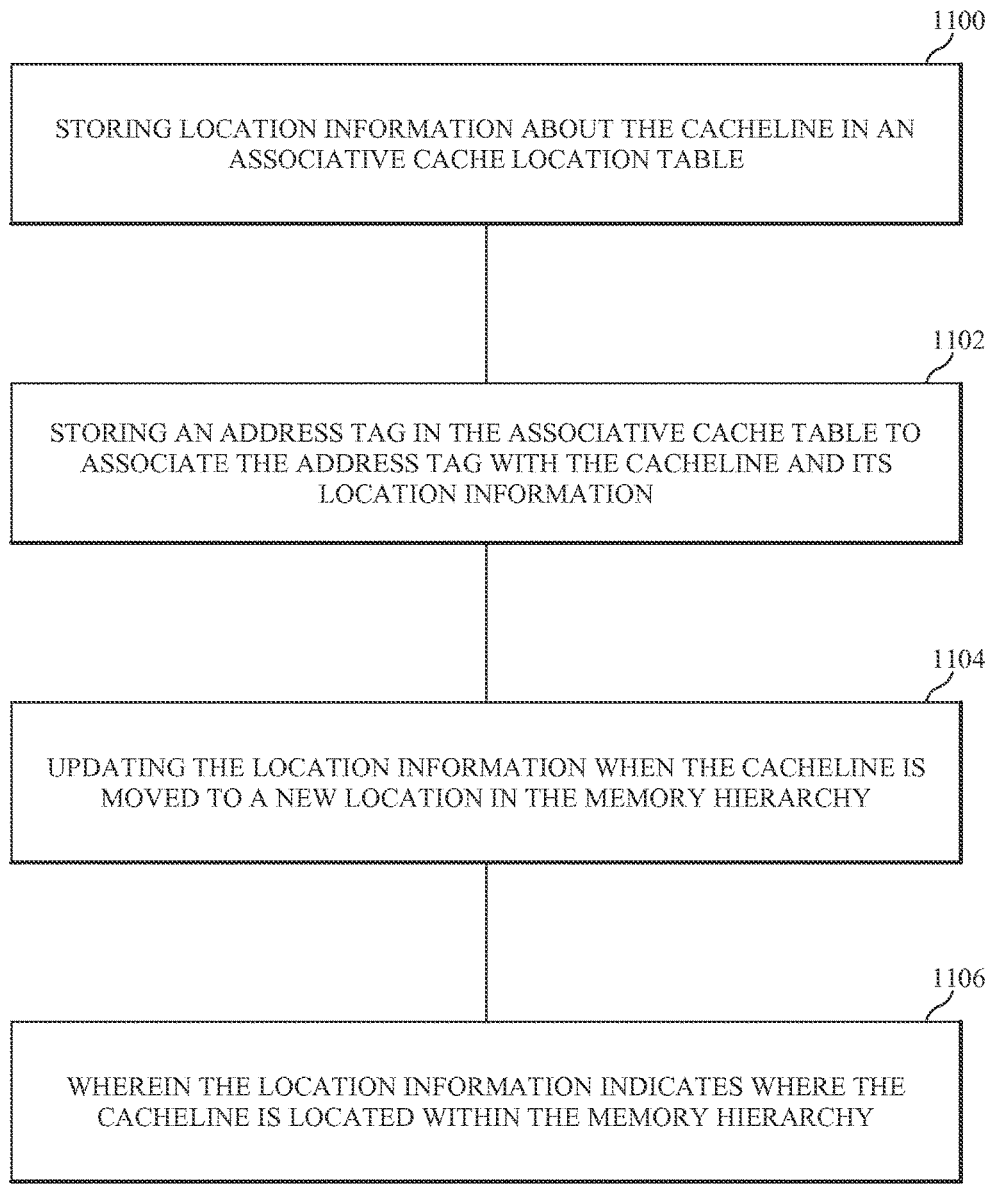
FIGS. 11 and 12 are flow diagrams associated with method embodiments.
Figure 12:
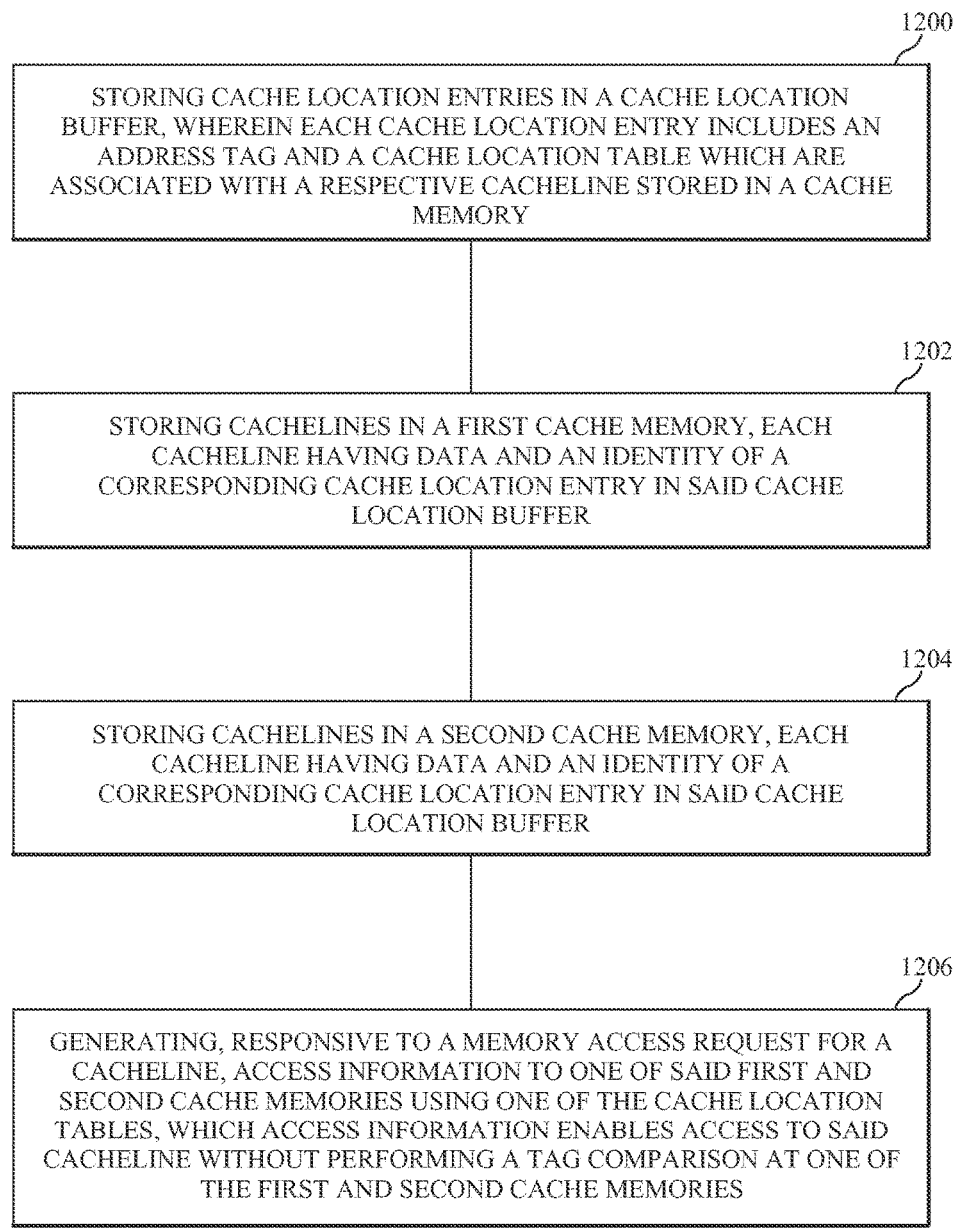

The embodiments can also be expressed as methods, examples of which are provided as FIGS. 11 and 12. In FIG. 11, a method of tracking the location of a cacheline in a memory hierarchy including one or more levels of cache memory includes various steps. At step 1100, cache location information about the cacheline is stored in a cache location table. At step 1102, an address tag is stored in the cache table to associate the address tag with the cacheline and its location information. At step 1104, the cache location information is updated when the cacheline is moved to a new location in the memory hierarchy, wherein (block 1106) the cache location information indicates where the cacheline is located within the memory hierarchy.

In FIG. 12, a cache memory storage method includes various steps. At step 1200, cache location entries are stored in a cache location buffer, wherein each cache location entry includes an address tag and a cache location table which are associated with a respective cacheline stored in a cache memory. Cachelines are stored in a first cache memory at step 1202, each cacheline having data and an identity of a corresponding cache location entry in the cache location buffer. Cachelines are also stored in a second cache memory at step 1204, each cacheline having data and an identity of a corresponding cache location entry in the cache location buffer. At step 1206, and responsive to a memory access request for a cacheline, access information is generated to one of said first and second cache memories using one of the cache location tables, which access information enables access to the cacheline without performing a tag comparison at the one of the first and second cache memories.

The steps depicted in FIGS. 11 and 12 can be performed in various orders and some steps can be performed in parallel or sequentially. These method embodiments, the system embodiments described above, and other embodiments may provide various beneficial results. For example, Applicants have performed detailed simulation studies which have shown that cache implementations associated with the embodiments described herein can save substantial energy compared with conventional cache systems and can also result in caches with substantially shorter access time. For example, a system similar to the one depicted in FIG. 5a will consume 42% lower dynamic energy for an L1 read hit than the conventional cache implementation as depicted by FIG. 3 for an 8-way 32 kbyte cache. For a 16-way cache size of 64 kbyte, the corresponding saving is more than 50%. Using the banking technology brought forward in FIG. 7, the corresponding dynamic power savings are 53% for an 8-way 32 kbyte cache and 69% for a 16-way 64 kbyte cache. Furthermore, studies have shown that the L2 cache depicted in FIG. 5a would have about 40% shorter access time than the L2 cache depicted in FIG. 3 for a 16-way 1 Mbyte cache.

Even though the examples above contain up to two cache levels and up to two CLB levels, those skilled in the art will understand that the techniques described herein can be generalized to apply to more levels of caches and more levels of CLB. There is no requirement that the number of cache levels and the number of CLB levels are the same. There could for example be more cache levels than CLB levels in a cache hierarchy, or vice versa, even though the examples described for example in FIGS. 9 and 10 are described as a two level tag-less cache hierarchy.

Figure 13:
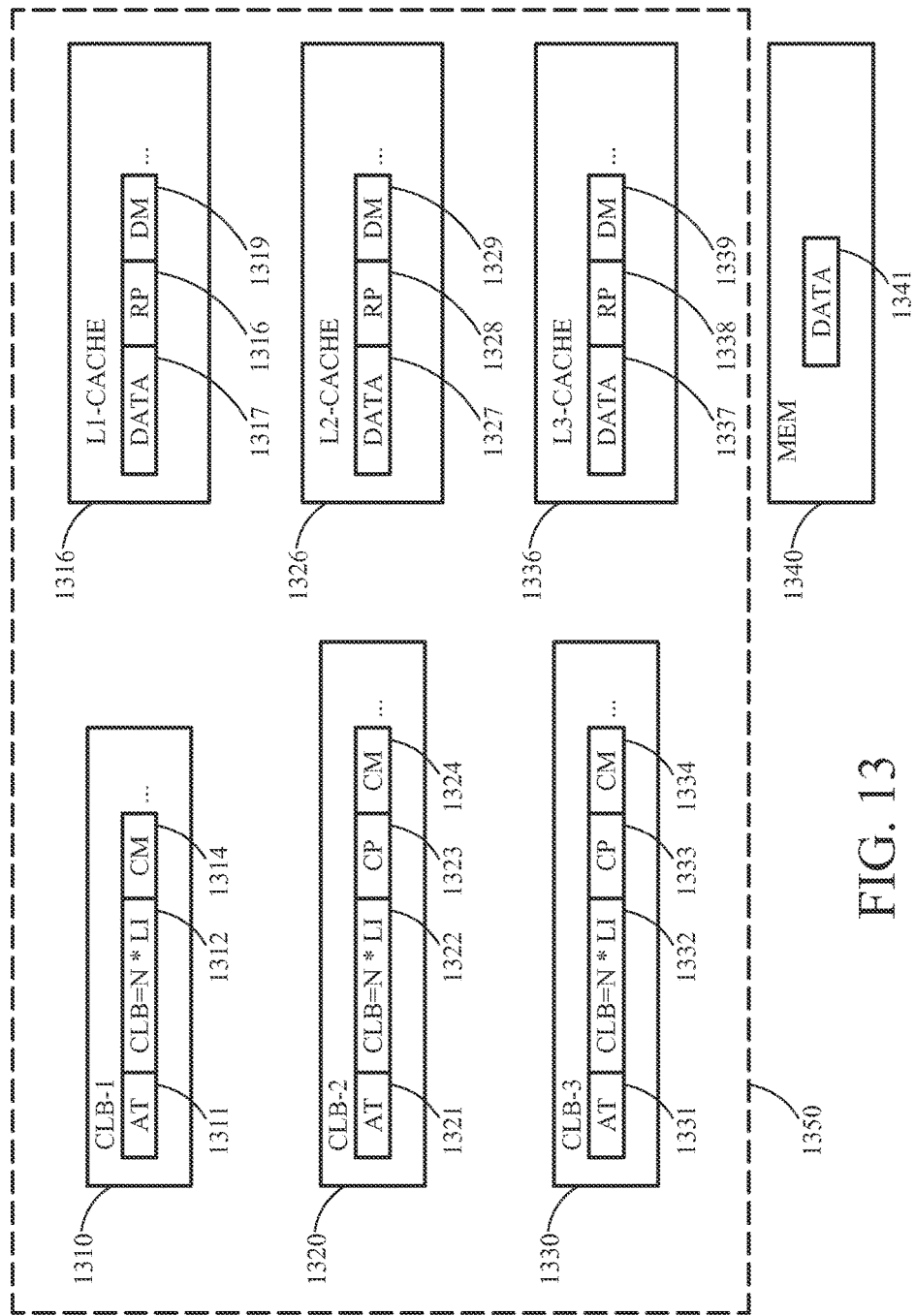
FIG. 13 is a block diagram illustrating a three-level tag-less cache hierarchy according to an embodiment.

FIG. 13 shows an example of a three-level tag-less cache hierarchy 1350 coupled to a memory 1340 having data 1341 stored therein. The CLBs at all three levels 1310, 1320, 1330 store entries including address tag information 1311, 1321, 1331, CLT information for N cachelines 1312, 1322, 1332, organized as N different LI entries, and some associated metadata CM 1314, 1324, 1334. CLB2 and CLB3 also store a CLB pointer named CP 1323 and 1333 which performs a similar task as the C1P 923 of FIG. 9 and points to an entry in the next lower CLB level. Each of the three cache levels 1316, 1326, 1336 contains entries including cacheline data 1317, 1327, 1337 and a replacement pointer RP 1318, 1328, 1338, performing a similar task as the C2P 942 of FIG. 9. Each entry also contains some metadata DM 1319, 1329, 1339 associated with the cacheline. It should be noted that the metadata DM1319 associated with a cacheline 1317 of a tagged cache 1316, may very well store similar metadata as cachelines stored in tagless caches 1326 and 1336. The metadata may for example store a replacement pointer RP, an alternative location pointer AP, a dirty indicator D, and so on.

It should be noted that there could be substantial differences between the implementation details between CLB and caches of different levels. For example, the number of bits and formats for the different fields may differ between the different levels and different embodiments, the amount and nature of the metadata CM and DM, which can be used to, for example, store dirty bits, reference bits, as well as other items described below, may also differ between different levels and different embodiments and the number of cachelines N covered by a CLT may also differ between the different levels.

Figure 14:
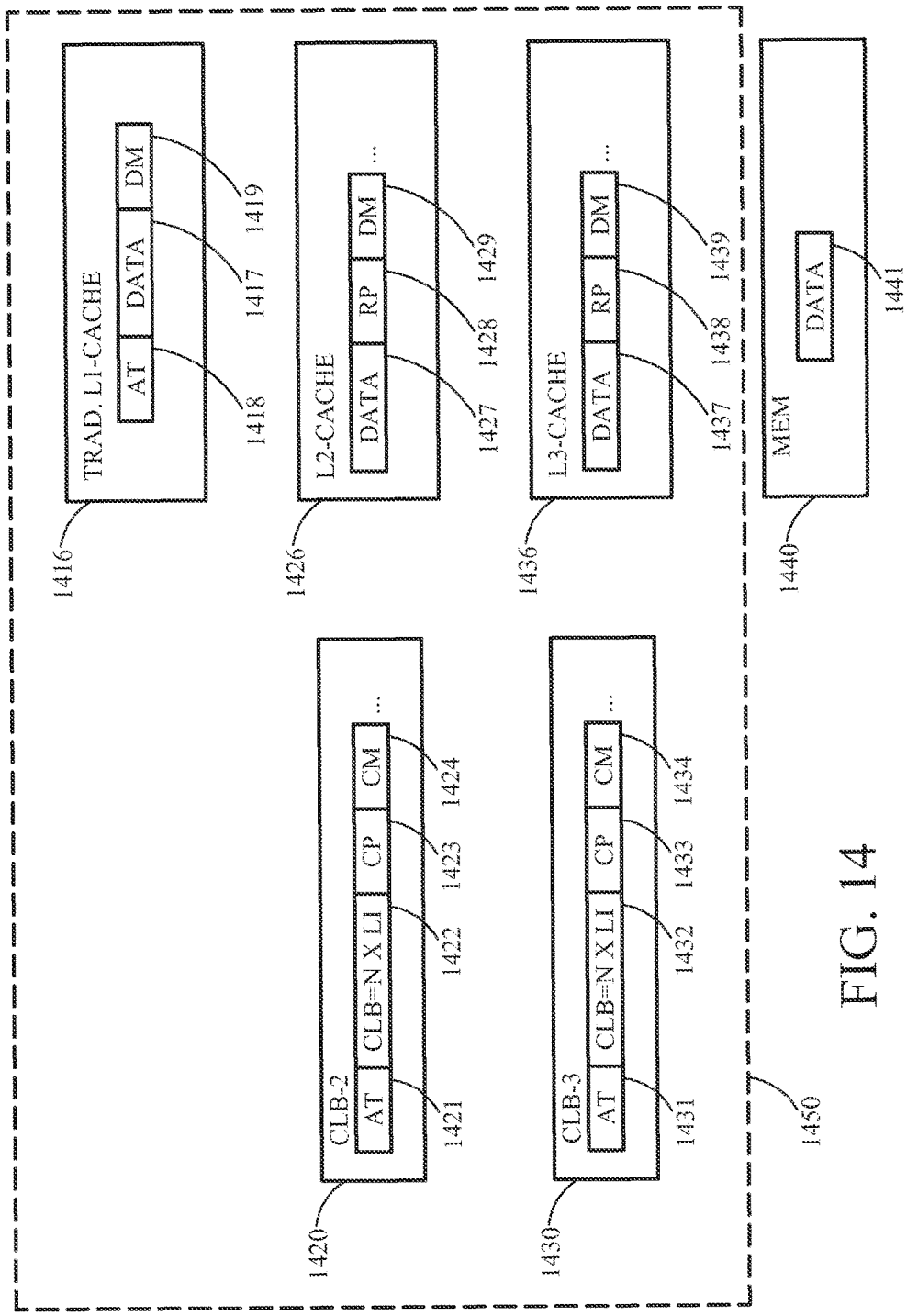
FIG. 14 is a block diagram illustrating a cache hierarchy with a mixture of tag-less caches and tagged caches according to an embodiment.

According to other embodiments, tag-less caches can coexist in the same cache hierarchy as traditional caches, i.e., those which store address tags, "tagged" caches. Traditional caches may exist as higher and/or lower level caches than tag-less caches. FIG. 14 shows how a traditional L1 cache 1416 coexists in the same cache hierarchy 1450 as two levels of tag-less caches, L2 and L3 1426, 1436. Each entry in the traditional L1 cache 1416 stores the data of the cacheline 1417 and an address tag 1418 associated with each cacheline. There may also be some metadata 1419 associated with address tag 1418. By way of contrast, the tag-less caches 1426 and 1436 have cacheline entries which contain data fields 1427, 1437, RPs 1428, 1438 and, optionally, metadata DM 1429, 1439, which fields operate as described in earlier embodiments.

In one embodiment, the higher levels CLBs 1420, 1430 can track a cacheline's location in the traditional L1 by storing Level=1 and the identity of the Way information in an LI 1422, 1432 associated with the cacheline. In another embodiment, higher-level CLBs 1420,1430 do not track the cacheline's exact location, but instead store a "L1 pattern" in an LI 1422 and/or 1432 associated with the cacheline, indicating that that the L1 cache 1416 has a cached copy. This embodiment could help extend coherence filtering to also work for data in the L1 cache 1416. In one embodiment, the L1 pattern indicates that the L1 may contain a valid copy, but that copy may also have been replaced by a silent replacement, which technique is described in more detail below. In such an implementation coherence filtering would work less well. The higher level CLBs 1420 and 1430 have entries which include, in addition to the LI fields 1422, 1432, AT fields 1421, 1431, CP 1423, 1433 and, optionally, metadata CM fields 1424, 1434. For completeness, the embodiment of FIG. 14 also shows the (main) memory 1440 and its stored data 1441.

In one embodiment, CLB-2 1420 can be accessed in parallel with the traditional L1 cache 1416 to cut the potential access latency to the higher-level caches.

In one embodiment, the L1 cache 1416 does not contain any address tags 1418 and its data is accessed in parallel with CLB-2 1420. If the L1 cache 1416 is direct mapped and the LI in CLB-2 1620 associated with an accessed cacheline stores the L1 pattern, it is determined that the data read from L1 cache 1416 is associated with the requested cacheline and results in an L1 cache hit. If the L1 cache 1416 is associative, the number of different L1 patterns are increased to match the number of ways in the L1 cache 1416, e.g.: "L1 Way1 pattern", L1 Way 2 pattern" etc. The identity of L1 pattern stored an LI associated with an accessed cacheline will determine in which way the corresponding L1 cacheline is stored Cache Space Management (Allocation and Eviction)

A tag-less cache, as for example depicted in FIG. 9, can track the location of a cache line using a single active LI pointer in either CLB1 or CLB2. This can for example be used to implement an exclusive cache hierarchy. In order to implement an inclusive or non-inclusive cache hierarchy it is sometimes necessary to track several locations in the cache hierarchy for a cacheline: the place closest to the core associated with the cacheline (referred to herein as a primary level storing a primary cacheline in its primary location); and at least one more place (referred to as alternative location(s)) in some higher-level caches (referred to as alternative levels). This can be achieved by extending the information stored in in CLB1 910 and CLB2 920 of FIG. 9 to store more than one LI pointer associated with each cacheline they track.

An alternative method is to extend the metadata (for example DM 1318, 1329, 1339, associated with cachelines in FIG. 13) with information about an alternative cache location in another cache. In one embodiment the metadata 1318, 1329, 1339, are extended to store an alternative location pointer (AP). In one embodiment, the AP stores the Level and Way information of a next higher alternative location. In one embodiment, cacheline metadata associated with a cacheline may also be extended to store one or more of the following information: a dirty indication (D), indicating that some data of the cacheline have been modified while residing at this cache level or any lower cache levels; alternative indication (A), indicating that the data space associated with this cacheline is an alternative location; and an initialized alternative location (I), indicating that the alternative location associated with the cacheline contains data identical to the data of the primary cache location, unless the primary location is dirty.

When a primary cacheline is evicted, and it has been determined that its alternative location has been initialized and that the primary location does not contain dirty data, a so-called silent replacement can be performed. This implies that no information will be transferred between the primary and alternative cache levels. In one embodiment, a cache implementation storing an AP metadata associated with a cacheline, such as the cacheline depicted in FIG. 13, a replacement activity that has decided to evict a cacheline can perform a silent replacement by copying the evicted cacheline's alternative location information AP, stored in its metadata 1319, to the active LI associated with the cacheline, after which the cache place formally known as its alternative location becomes its primary location without any information being moved between the primary location and the alternative location.

In one embodiment, the active LI associated with the evicted cacheline can be found by following a pointer chain by following the RP pointer 1318 associated with the evicted cacheline pointing to the CLB entry it is pointing to, then following its CP pointer (if active) to the CLB entry it is pointing to, then recursively repeating the last step until a CLB entry without an active CP pointer is reached, and then accessing the LI associated with evicted cacheline stored in that CLB entry.

In another embodiment, referred to as whisper replacement, only some metadata is transferred between the primary and alternative locations on replacement. In one embodiment, the silent replacement described above is extended by the existence of the alternative indicator A in its metadata (1329,1339) stored at the higher-level caches L2 1326 and L3 1336. In whisper replacement, the A indicator of the alternative location associated with the evicted cacheline is changed to indicated that it is no longer an alternative location. In addition, the mechanism for whisper replacement is identical to that of silent replacement.

In one embodiment, an AP associated with a cacheline always contains a valid pointer to an alternative location associated with its cacheline. If there is no alternative location in a higher cache level for the cacheline, its AP should contain the memory pattern, indicating that the memory location identified by its corresponding physical address is its alternative location.

A cacheline containing modified data is referred to as a dirty cacheline. This would for example be indicated by the dirty indicator D. When a dirty cacheline is evicted from a cache, the modified part of the cacheline, or the entire cacheline, will have to be written to some other location, here referred to as the writeback destination. Such a write operation is known as a writeback. A writeback destination could be, for example, a higher-level cache or memory.

Implementing writebacks in traditional caches can be complex. There could be many so-called race conditions associated with a writeback. For example, there could be a coherent read request sent from another cache on its way to the cache that will not be able to find the cacheline in the cache. There is also substantial complexity associated with selecting the writeback destination. Sometimes, the dirty cacheline is temporarily held in a buffer, known as a writeback buffer, or a so-called victim cache, until the writeback destination and its associated resources, such as the space used to hold the cacheline data value, have been allocated.

In one embodiment, the writeback location information associated with the cacheline is used to determine its writeback destination. This information could, for example, identify an appropriate cache level or memory as the writeback destination. It may also contain way information or other means to identify a physical writeback destination location, such as some address bits. Knowing the writeback destination prior to the eviction of the dirty cacheline can limit the overall complexity and also avoid the need for a writeback buffer.

In one embodiment, a writeback destination for a cacheline is identified by the alternative location pointer AP associated with it. Upon eviction of a dirty cacheline, its AP information is used to update its associated LI information in a CLB. Any future accesses to the cacheline will now be directed to the former writeback destination, which has now become the primary location for the data. The dirty cacheline will also be transferred to the alternative location, which may take a while due to its relatively large size. The writeback destination (i.e., the alternative location) should be marked as "not accessible yet" until the dirty cacheline has been written to its location.

In one embodiment, an alternative indicator (A) found in the metadata 1329, 1339 associated with the writeback destination is used to mark it as "not accessible yet". Once the dirty data is accessible at the writeback destination, its alternative indicator A is changed to reflect that it is now accessible. An access attempt to an a location marked as "not accessible yet" (either from lower-level caches, from a core or external coherence requests) will be stalled until the location becomes accessible. The dirty indicator D of the writeback destination should indicate that the data at this new primary location is still dirty.

In one embodiment, a replacement activity that has selected to evict a cacheline can utilize an "alternative location initialized" indicator (I) can distinguish between AP locations that have not been initialized and AP locations that have been initialized, i.e., AP locations in which a recent copy of the cacheline data is stored. When a replacement activity, that has selected to evict a cacheline, selects a clean (not dirty) cacheline victim with an AP location that has not been initialized, neither silent nor whisper replacements can be performed. Instead, an operation referred to as a clean writeback has to be performed. A clean writeback operation is similar to the writeback operation described above. However, the dirty indicator D of the clean writeback destination (identified by the alternative location information) should indicate that the cacheline written to the writeback information is not dirty.

A cacheline may indicate memory as its alternative location by storing a pattern associated with (main) memory in its AP. If the memory, or any other alternative locations identified as the writeback destination by the AP, does not have a mechanism for encoding "not accessible yet" (as described above), the implementation of writeback described above can be altered. Instead of copying the AP information associated with the replaced cacheline to its associated LI, a locked pattern is stored in the LI. This pattern will be changed to the memory pattern once it can be determined that any future accesses will return the data newly written back to memory. This could for example be when the writeback data has reached the memory controller.

In one example of a cache hierarchy, a cacheline Y may be installed in a lower-level cache (e.g., L1) upon a first access to the cacheline Y. At this point there is no alternative location in the cache hierarchy and its AP is set to the memory pattern. Depending on the cache allocation policy it may be determined that the cacheline should have an alternative location at cache level X associated with it. In one embodiment, space for the cacheline can be allocated before it is selected as a replacement victim in the lower-level cache, referred to as an "eager allocation". This could for example happen close in time to when the data was accessed the first time, after some additional duration or when it is determined that it will probably be replaced soon. This could for example be determined by looking at a cacheline's priority of an LRU replacement strategy selecting victims within a cache set based on how long they have been unused. When the eager allocation starts, first an alternative location cacheline space is allocated at cache level X, possibly by evicting other cachelines at cache level X; second the alternative location information AP, associated with the cacheline Y in L1 is updated to point to this location. If the cacheline in L1 is replaced before its AP is updated, its AP will direct its writeback to memory. In such a situation, care must be taken to ensure that any space allocated for cacheline Y in level X is marked as "free". In one embodiment a replacement of a cacheline for which an alternative space is about to be allocated in a higher-level cache is stalled until its AP pointer has been updated. In one embodiment, the AP could contain a "locked" pattern in its AP until it has been assigned an alternative location, which makes the cacheline immune to replacements until its AP contains the pointer to the alternative location.

A cacheline in a cache level that is higher than its primary location (i.e., it is an alternative location for a cacheline in a lower-level cache) may itself have an alternative location in an even higher cache associated with it. That way, there could be a chain of AP pointers linking many higher-level alternative locations with a primary location. In one embodiment, such a linked list of alternative locations is initially set up from the lower level and up. For example, the alternative location X in the previous example is allocated and pointed to by the AP of the primary location associated with a cacheline, before an alternative location at the level Y (Y is higher than X) is allocated and the AP pointer of the alternative location at level X is made to point to it. In one embodiment, the alternative location at cache level Y is not allocated until cache level X becomes the primary level for the associated cacheline.

When replacing a cacheline at a cache level higher than L1, it may be beneficial to select a cache location which is not an alternative location. The rational being that the cacheline associated with an alternative location is currently active in a lower-level cache and thus currently being actively used such that replacing that cacheline would be a bad choice.

In the unlikely event that all cachelines of a cache set at a cache level X, from which a victim are to be selected, are marked as alternative locations, one option is to simply not evict any cacheline at level X and thus not fulfill the desire to allocate an alternative location for a cacheline in a lower-level cache. In that case, the AP value of the lower-level cache should be unchanged.

If victimizing an alternative location is deemed necessary, for example for supporting prefetching to a specific cache level, implementing DMA activity to a specific cache level or purposefully trying to replace a certain cacheline from a specific cache level, then there are several options to implement replacement of an alternative location. In one embodiment, the CLB storing the active LI for the primary location of the cacheline is identified. Then, the AP associated with that cacheline in the primary level is changed to store the AP value of the cacheline previously associated with the replaced alternative location. If there previously was only one alternative location linked to the primary location, this AP value will be the "memory pattern".

It should be noted that the overall scheme of tracking alternative location, handling writeback and eager allocation according to some embodiments described above decouples three activities that traditionally are done at the same time, i.e., 1) finding a new space for a victim; 2) moving the data; and 3) changing the tracking mechanism (address tags) to reflect this move. This allows for a simpler and more effective implementation of the cache hierarchy that potentially can remove race conditions.

Even though the replacement and writeback examples above have been described in the context of a cache hierarchy consisting of only tag-less caches, it should be noted that the proposed solution could work in a similar way for a cache hierarchy with mixed tag-less and traditional caches, such as the cache hierarchy depicted in FIG. 14, or a cache hierarchy built from only traditional caches extended with appropriate metadata. In one embodiment, the metadata DM 1418 could contain alternative location AP information, an alternative location initiated indicator I, and a dirty indicator D to enable the silent replacement, whisper replacement, clean writeback, dirty writeback and eager allocation as described above.

Reuse-Aware Placement

Often, cachelines are installed in cache level where they will never be reused before they are evicted. In order to save energy and to use the cache space in a more efficient way it would be beneficial to predict each cacheline's reuse behavior and to only install it in the cache levels where they is likely to be reused. According to another embodiment, a Reuse Aware Placement (RAP) strategy, described herein, performs such reuse prediction. To accomplish this, RAP tracks the behavior of an application's datasets and learns where their data is reused throughout the hierarchy, e.g., during the execution of the application. This information drives a global cache placement policy that places data in the appropriate levels when data are installed and/or evicted from/to the different cache levels. By eliminating installations and unnecessary data traffic for caches where the data will not see reuse, RAP significantly reduces energy in the memory hierarchy.

In one embodiment, RAP is built from a combination of some or all of these 5 components:

1. Identifying dataset: The reuse behavior may be tracked for individual cachelines. Another alternative is to track the behavior for a group of cachelines that are believed to have a similar behavior, here referred to as a dataset. In one embodiment, data located close to each other in the address space are determined to belong to the same dataset. In one embodiment, each dataset may be identified by assistance from the programmer, the compiler and/or a runtime system. In one embodiment, the Program Counter (PC) identifying the instruction that brings a cacheline into the cache hierarchy from memory, or from a cache level higher that a specific RAP level threshold, is used to identify the dataset it belongs to. In another embodiment, the PC that caused a TLB fault for the page where the data resides is used to identify the dataset of that page. In another embodiment, the PC of an instruction that generated at least one of the "cacheline requests" that initiated a hardware prefetch stream to start is used to identify the dataset. In another embodiment, call stack information (for example, the identity of the functions called to get to a specific PC) is used to identify the dataset. In one embodiment, two or more of the above schemes are combined for identifying a dataset. Those skilled in the art will realize that, in order to save storage space, both the call stack and the PC may be represented by some subset of their address bits or by some other transformation function using their address bits as an input.

2. Assessing data reuse: While a cacheline resides in a cache, its usage can be tracked and stored as reuse information metadata associated with the cacheline. In one embodiment, the reuse information consists of a counter counting the number of accesses to the cacheline. In one embodiment, the reuse information consists of a single reuse bit that records if a cacheline has been accessed at all after its initial installation at the cache level. In one embodiment, the reuse for a cacheline at a specific cache level is determined when the cacheline is replaced by looking at its reuse information.

3. Selective learning: One way to study a dataset's reuse at the different cache levels is to install its cachelines at all cache levels (for example using standard inclusive or exclusive cache placement strategies) and record its reuse behavior upon eviction. However, such reuse measurement requires all cachelines to be installed in all cache levels, which defeats the purpose of RAP. An alternative way of learning the reuse behavior is to only learn from a subset of cachelines, referred to as the learning cachelines. In one embodiment, only cachelines belonging to certain cache sets are learning cachelines (set sampling). In another embodiment, only accesses to certain selected pages or micropages are learning cachelines (page sampling). In one embodiment, only cachelines belonging to certain pages or micropages are learning cachelines. In yet another embodiment, the learning cachelines are selected randomly. The learning cachelines may also be selected based on which dataset they belong to. One could also combine several of the selection methods described above. In one embodiment, learning cachelines are installed in all levels, while the rest of the cachelines will be installed only in the levels identified by a placement policy associated with their dataset. In one embodiment, cachelines for which a dataset association has not yet been made, or cachelines belonging to a dataset for which no placement policy has yet been determined will be installed according to some default installation policy. In one embodiment, such a default policy is to install the cacheline at all cache levels.

4. Recording data reuse: When a cacheline, e.g., a learning cacheline, is replaced from a cache level, its reuse information metadata can be collected and used to make global placement policy. For example a placement policy for its dataset. In one embodiment, a Reuse History Table (RHT) is used to record the data reuse. RHT collects reuse information from replaced learning cachelines at different cache levels. In one implementation, each entry in the RHT is associated with a dataset and records its reuse history for each level in the cache hierarchy. In one embodiment, each RHT entry consists of a dataset identifier and a set of counter corresponding to each level in the cache hierarchy. This could, for example, be a counter that is incremented each time an unused learning cacheline is replaced from the corresponding cache level and another counter that is incremented each time a reused learning cacheline is replaced. Another possibility is to have a reuse counter in combination with a replacement counter, incremented each time a learning cacheline is replaced. In one embodiment, a reuse information is a counter value which is added to a reuse counter when a learning cacheline is replaced.

5. Policy-based data placement: Based on the reuse information collected in the RHT, a suitable cache placement policy can be determined for each dataset. For example, for a dataset that has shown good reuse at cache level X but not at cache level Y, the corresponding placement policy is to install the dataset in cache level X, but not cache level Y. Based on the values of the counters of RHT entry, a placement policy is made for its corresponding dataset. For example, when one counter reaches a predetermined value, for example the a replacement counter reaching its maximum value, the value of some other counters are consulted to make placement decision. For example, if the reused counter for the cache level corresponding to the replacement counter is higher than 30% of its maximum value, a decision is made to install data of the corresponding data set at that cache level. In another example, if either of the reused or unused counters for a specific cache level reaches a maximum value, and the reused counter is higher than 50% of the unused counter, a decision is made to install data of the corresponding data set at that cache level. This placement policy may change over time depending on cache resizing or cache sharing effects in caches shared by many applications. It may also change during different execution phases of the application. In one embodiment, the installation policy for each dataset is represented by a bit vector, with each bit corresponding to a level in the cache hierarchy. The value of each bit reflects the placement policy for that level. All non-learning accesses will then consult the placement policy bit vector for the dataset when its cacheline is moved between the cache levels and will only install the cacheline in the levels having its corresponding bit set in the bit vector. In another embodiment, the installation policy per level may be a fraction, stating what fraction of cachelines of the associated dataset should be installed at that level.

The most recent placement decision for each cache level is recorded per dataset as its corresponding placement policy for that cache level. The placement policy may be recorded in a policy field in each RHT entry, may be recorded in a separate placement policy table or a combination thereof. An entry in a placement policy table consists of a DID tag and the placement policy representation, for example a bit vector. On a lookup in the table using a dataset identifier, a DID tag is compared with the dataset identifier in order to find the corresponding placement policy. In one embodiment, a placement policy table is indexed by a portion of a dataset identifier (for example a PC) and stores entries consisting of a placement policy representation. A lookup in such a table may not determine if the placement policy representation is indeed the placement policy for a specific dataset, but if the table is large enough the accuracy of a lookup can still be determined to be sufficient.

Figure 15:
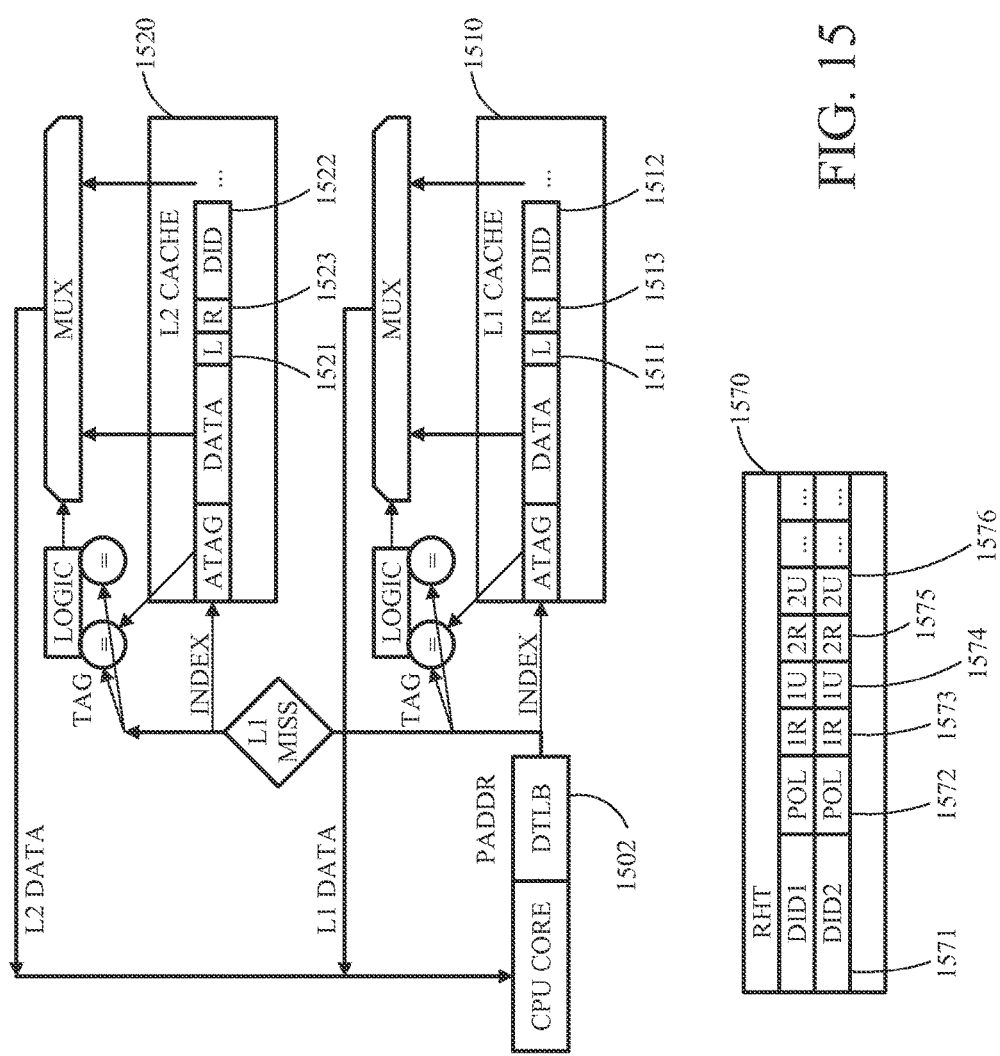
FIG. 15 is a block diagram illustrating a tagged cache hierarchy extended to support a reuse-aware cache placement according to an embodiment.

FIG. 15 shows one example of an implementation of RAP in a traditional cache hierarchy, i.e., with tagged caches rather than tag-less caches, according to an embodiment which can be viewed as an extension of FIG. 3 with its DTLB functionality represented by the box 1502. Even though FIG. 15 only shows two cache levels, its functionality can be generalized to more than two cache levels. Each cacheline in the L1 cache 1510 and in the L2 cache 1520 has been extended with a reuse information field R (1513 and 1523), recording the reuse behavior of the cacheline while it resides in the cache, a learning bit L (1511, 1521) indicating whether or not the corresponding cacheline is a learning cacheline, and a dataset DID field (1512, 1522), identifying a dataset with the corresponding cacheline. The remaining unnumbered elements of the cache hierarchy of FIG. 15 function in the same way as corresponding elements illustrated in FIG. 3 and reference is made to the foregoing description of those elements above.

A Reuse History Table (RHT) 1570 has also been added. Each entry in the table contains a dataset identifier DID 1571, identifying the dataset associated with each table entry, and some reuse information collected for that dataset. In this implementation example, counters counting the number of learning cachelines with reuses at each level (1R, 2R, 3R . . . ) are shown (1573, 1575). Also counters counting the number of unused learning cachelines (1U, 2U, . . . ) are shown (1574, 1576). Based on the counter values, a placement policy for the dataset is selected. The current placement policy is stored in the policy field, POL 1772. In one embodiment, the policy is represented by one bit for each level in the cache hierarchy indicating whether or not the dataset identified by DID 1771 should be installed in that cache level. Those skilled in the art will understand that a similar functionality can be achieved using a multitude of different implementation choices. For example, the policy information could be distributed to several local policy tables located close to the different cache levels. In one embodiment, the placement policy for non-learning accesses are encoded in some metadata associated with each cacheline, for example the DM fields 1319, 1329, 1339 of FIG. 13.

In one embodiment, RAP is used to make placement decisions for a cache hierarchy with four cache levels: 4 kB, 32 kB, 256 kB and 8 MB respectively. Each cache entry is extended to store a leaning bit, one or more reuse bits and a dataset identifier consisting of the 12 lowest bits of the PC that brought the cacheline from memory into the cache hierarchy. The RHT is organized as a set-associative cache with 256 sets of four ways each. An RHT entry contains a DID tag of 6 bit, a policy field of 4 bits (each corresponding to the four cache levels) and two counters U and R of 6 bits each for each cache level. When either of the two counters reaches its maximum value, a decision is made to install data in the corresponding cache level if the corresponding R counter value is higher than the threshold, e.g., 48. Over a wide set of applications, RAP according to these embodiments is shown to make substantially fewer installations at each cache level. On average, RAP performs fewer than 50% of the installs compared with a standard cache hierarchy with no placement policy.

Figure 16:
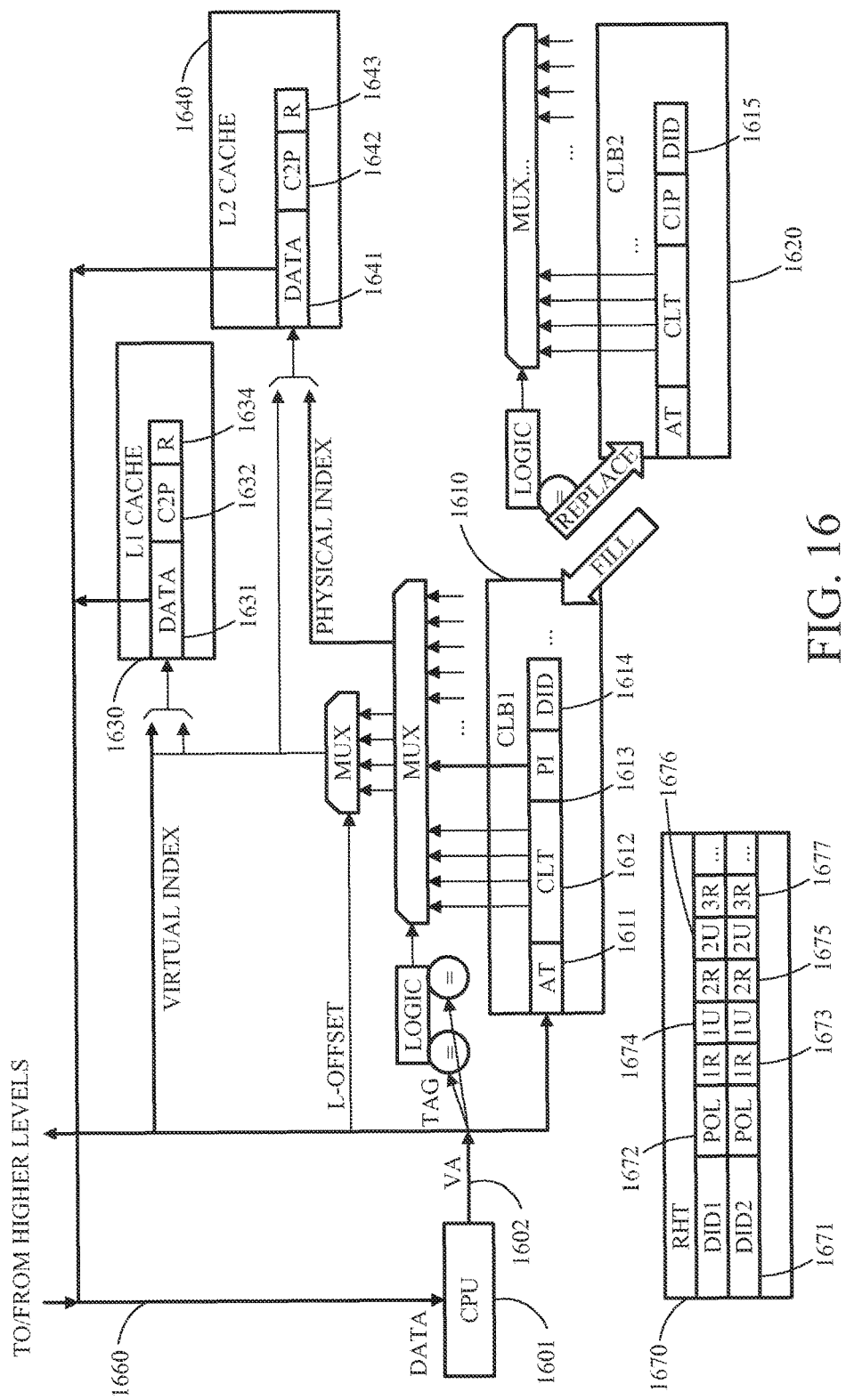
FIG. 16 is a block diagram illustrating a tag-less cache hierarchy extended to support a reuse-aware cache placement according to an embodiment.

FIG. 16 shows an example of an implementation of RAP in a tag-less cache hierarchy according to another embodiment, which can be viewed as an extension of FIG. 9. Even though FIG. 16 only shows two cache levels, its functionality can be extended to more than two cache levels. Each cacheline in L1 cache 1630 and L2 cache 1640 has been extended with a reuse information field R 1633 and 1643, recording the reuse behavior of the cacheline while it resides at each cache level, and a dataset DID field, identifying a dataset of the cacheline. In this example, a dataset identifier (DID) has not been added to each cacheline in the L1 and L2 caches. Each entry in CLB1 1610 and CLB2 1620 have instead been extended with DID information 1614 and 1615, respectively, associated with each of their entries. The C2P pointers 1632, 1642 of each cacheline in L1 cache 1630 and L2 cache 1640 point to entries in CLB2 1620 (that may in turn may point to CLB1 1610). The DID of the associated CLB 2 entry 1615 determines the dataset ID for each cacheline in L1 cache 1630 and L2 cache 1640. The remaining elements in this portion of FIG. 16 function in the same way as those described above with respect to FIG. 9 and reference is made to that description for conciseness.

A Reuse History Table (RHT) 1670, similar to the one in FIG. 15, has also been added. Each entry in the table contains a dataset DID 1671, identifying the dataset associated with each table entry, and some reuse information collected for that dataset. In this example, counters counting the number of reuses at each level 1R, 2R, 3R, . . . are shown and referenced as 1673, 1675, 1677, respectively. Also counters counting the number of unused cachelines 1U, 2U, . . . are shown and referenced as 1674 and 1676). Based on the counter values, a placement policy 1672 for the dataset is shown. Those skilled in the art will appreciate that a similar functionality can be achieved using a multitude of different implementation choices.

As earlier discussed, a dataset may be identified by a PC of an instruction that generated at least one of the "cacheline requests" that caused a hardware prefetch stream to start. This dataset will select learning accesses like any other dataset and learn the best placement strategy across the cache levels for the prefetched dataset, similarly to any other dataset described in these embodiments.

In one embodiment, if poor reuse is determined in the lowest cache levels where the dataset of the prefetch stream has installed the cacheline, then the prefetch stream performing these prefetches can be terminated and the PC's ability to start new hardware prefetch streams in the future can be downgraded. In contrast, if good reuse is determined in the lowest cache levels where the dataset of the prefetch stream has installed the cacheline, the PC's ability to start new hardware prefetch streams in the future may be upgraded.

In one embodiment, each CLB entry is extended with reuse information R and their reuse assessed when the CLB entry is replaced. Similarly to the RHT indicating the reuse probability for cachelines, a similar structure can be used to track the reuse probability for CLB entries. In some embodiments, there could be single RHT assessing the reuse for both cachelines and data associated with a dataset. If there is a low probability for reuse for a CLB entry, it may not be copied to the lower CLB levels on a CLB miss to those levels. For example, a CLB entry of CLB-3 1330 of FIG. 13 may be used to find the active LI associated with a currently accessed cache line with its primary location in L3 cache 1336. This cacheline can now be moved to L1 and accessed there, while changing its associated LI 1332 in CLB-3 1330 to point to its new primary location in L1 1316. However, no CLB entry needs to be allocated in neither CLB-2 1320 nor CLB-1 1310 if the CLB-1 reuse has been deemed to be poor for this dataset. For a similar access example related to FIG. 14 with a traditional L1 cache 1416, the associated CLB entry in CLB-3 1430 would be changed to the L1 pattern, or some other means for indicating that the cacheline resides in the L1 cache 1416, and the address tag 1418 of the cacheline in the L1 cache 1416 is changed to correspond to its address.

The reuse information metadata associated with each cacheline in a cache, for example a cacheline in the L1 cache, could be extended to track what fraction of a cacheline has been accessed before eviction. This could, for example, be achieved by adding a bit pattern with each bit corresponding to a fraction of a cacheline. Whenever that fraction is accessed, the corresponding bit is set. Upon replacement it can be assessed how large a fraction of a cacheline has been accessed using a technology similar to the RHT table technique described above. This information can be used to detect very sparse usage of data associated with a dataset and prompt the movement of even smaller data units than a cacheline to the specific cache level. Such a movement of a data smaller than a cacheline may prompt the associated entry in CLB-3 of the above example to change its LI associated with the cacheline to store a "lower half in L1 pattern" or "higher half in L1 pattern".

In the case of a sparse usage of data, especially if only a fraction of a cacheline is used, the cacheline associated with a cache miss may not be installed in the L1 cache at all and a fraction of a cacheline (for example a word) can be sent directly to the core (CPU). The coherence system may still need to track such a movement, and an appropriate entry can be stored in the associated entry in CLB-3 of the above example for this purpose. For example a pattern "data sent to core" can be stored in the CLB-3 entry.

RAP placement policy according to an embodiment may find that a dataset has poor reuse in the lowest-level cache, and that placement in the second lowest-level cache, such as the L2 cache 1426 of FIG. 4 may be a better placement policy than placing it in the L1 cache 1416. This implies that cachelines belonging to that dataset can be known to never be found in the L1 caches (a L1 cache miss). Typically, optimized core implementations have instruction schedulers that schedule instructions dependent on a memory load instruction to be executed as soon as the data returned by the load is available, assuming that the load will hit in the L1 cache. If the data is returned even just one cycle later than the normal latency for an L1 hit, the dependent instruction will see a penalty much higher than just one cycle in modern out-of-order pipelines, caused by a phenomenon known as replay. It would therefore be beneficial for an instruction scheduler to be able to predict that the data will be accessed directly from the L2 and the data returned slightly later. Given that each dataset is managed by the RAP, data belonging to a specific dataset should consistently be placed in either the L1 cache or in the L2 cache. The instruction scheduling mechanism can therefore be enhanced to leverage this information.

In one embodiment, a memory instruction with a specific PC is assumed to access the same dataset as a previous memory access with the same PC. The call stack of the PC may also be used to identify the data set (similarly to the RAP scheme above). If the cacheline placement in a cache hierarchy is managed by a cache placement strategy, such as RAP, it can be assumed that the placement of the dataset in the cache hierarchy is consistent. For example, if the cachelines of a dataset have been found to reside in the L2 cache, but never in the L1 cache, this observation will very likely hold as a prediction for future accesses to the dataset. Thus, a cache-level predictor can be designed according to an embodiment that informs the instruction scheduler how early instructions dependent upon a memory instruction can be scheduled.

In one embodiment, such a predictor contains a table that is indexed by some of the PC address bits, optionally extended with some bits from the call stack. The table contains "cache level guess" information for each entry. The table is indexed using some PC bits of a load to lookup the corresponding "level guess". In one implementation, a last value prediction scheme cache be used and a single wrong guess will change the corresponding level guess for the next time the entry will be used. In some other implementations, there may be more of a hysteresis implemented and several wrong guesses are needed before a level guess is changed for that table entry. In one embodiment, a dataset identifier which is associated with the cacheline previously accessed by a load instruction is used to predict that a next access by the same load instruction belongs to the same dataset, and that the lowest cache level identified as a possible location for this dataset according to its placement policy is identified as the predicted cache level.

Pipeline Interaction

As previously described, a Cache Location Buffer (CLB), for example the CLB 505 or 509 of FIG. 5A, can provide level information that can guide the lookup in the cache hierarchy to go directly to the cache level where the requested cacheline resides. The level information may identify a specific level in the cache hierarchy, or some specific memory where the requested cacheline resides.

In one embodiment, the level information provided by the CLB is exact and determines the cache level of the requested data, as for example described above in conjunction with FIG. 5A. In another embodiment, the CLB level information represents a prediction of a cache level where the data resides with a high probability, wherein many of the methods described earlier for exactly tracking the cacheline location when it is moved can be relaxed and in many situations completely removed.

Figure 17A:
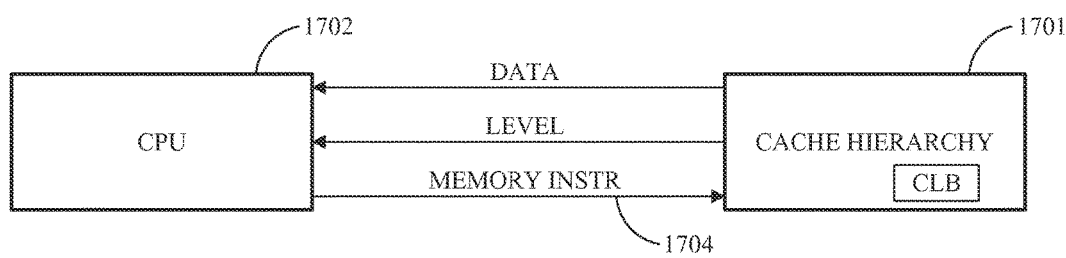
FIG. 17A is a block diagram illustrating the extraction of level information from a cache hierarchy and provision of the level information to a core according to an embodiment.

In one embodiment, the LEVEL information is fed to the CPU, as shown in FIG. 17A. Therein, after a memory instruction/access is sent, the LEVEL information that is extracted from the CLB entry 1700 in the cache memory hierarchy 1701 associated with that memory instruction, e.g., in the same or a similar manner as described above with respect to FIG. 5A, is provided to the CPU 1702 as shown by line 1704. The CPU 1702 can use this level information to predict the anticipated latency for the memory instruction which triggered an access to the cacheline which resulted in the CLB being consulted for that cacheline's location.

Typically, the latency for retrieving a requested cacheline is longer the further away from the CPU that requested cacheline resides and the larger the cache storing the requested cacheline is. Thus this level information can be used to inform the CPU about how long it will take to retrieve this data. Typically, retrieving data from memory is even slower, due to contention for resources so that level information such as the memory pattern could be used to predict the latency for retrieving the requested data. The latency information which is determined by the CPU based on the returned cache level information could, for example, be the best time latency achievable from the identified level. Alternatively, it could be an average latency time associated with the identified level, or any other comparable latency value that reflects the different latency times associated with the different cache levels (including here (main) memory as effectively cache level zero). This latency information can be used by the CPU to facilitate various optimizations, e.g., to adapt the manner in which an application is being executed based on the latency information. Various examples of such optimizations will now be discussed.

In one embodiment, if the memory instruction returns level information to the CPU which indicates an access latency longer than a specific threshold, then this memory instruction is determined to be a slow memory instruction. One possible optimization is to avoid allocating shared pipeline resources for other instructions which depend on this slow memory instruction until just before its requested cacheline is estimated to be returned, based on the cache level information. In one embodiment, a slow memory instruction will get an early wakeup information from the memory hierarchy itself, indicating that its requested data is about to be returned. In one embodiment, instructions dependent on a slow memory instruction will get an early wakeup information from the memory hierarchy itself, indicating that the requested data for the slow instruction is about to be returned.

Examples of such shared pipeline resources include, but are not limited to, physical registers, entries in a load queue, entries in a store queue entries in a combined load/store queue, and/or entries in an issue queue.

In one embodiment, shared pipeline are allocated for dependent instructions until it is determined that the memory instruction upon which those instructions depend is slow. Then certain shared pipeline resources can be de-allocated when the memory instruction has been determined to be slow. Such resources could for example be resources allocated to instructions dependent on the slow instructions.

By avoiding allocation (or releasing) shared pipeline resources associated with slow memory instructions, it may also be possible to achieve the same performance using fewer shared resources and thus save energy. For example, the number of waiting stations of a Tomasulu style pipeline, the length of the issue queue (IQ), the number of physical registers and/or the size of the load-store queue can be reduced. It is also possible to dynamically resize such structures, and to power-gate them to reduce energy.

In one embodiment, the CPU supports Simultaneous Multithreading (SMT), meaning that its pipeline executes instructions from several threads. An instruction scheduler is used to decide which instructions to enter into the pipeline, thus making it possible to choose between instructions from different threads. In this embodiment, the information about a slow memory instruction may steer the decisions of the instruction scheduler. For example, a thread with one or more outstanding slow memory instruction may be given a lower priority by the instruction scheduler. In another embodiment, the thread with the most outstanding slow memory accesses is given the lowest priority by the instruction scheduler, but many other possibilities exist. For example, the number of instructions dependent upon slow memory instructions may be considered, and/or the total number of waiting cycles left for a thread's slow memory instructions.

In a certain kind of SMT implementation, a thread switch may occur as a result of the identification of a slow memory access based on the level information and then no more instructions from its thread may be scheduled until one or more slow instructions have received their requested data, or are about to receive their requested data. Instead, instructions from another thread may be scheduled.

Coherence

Figure 17B:
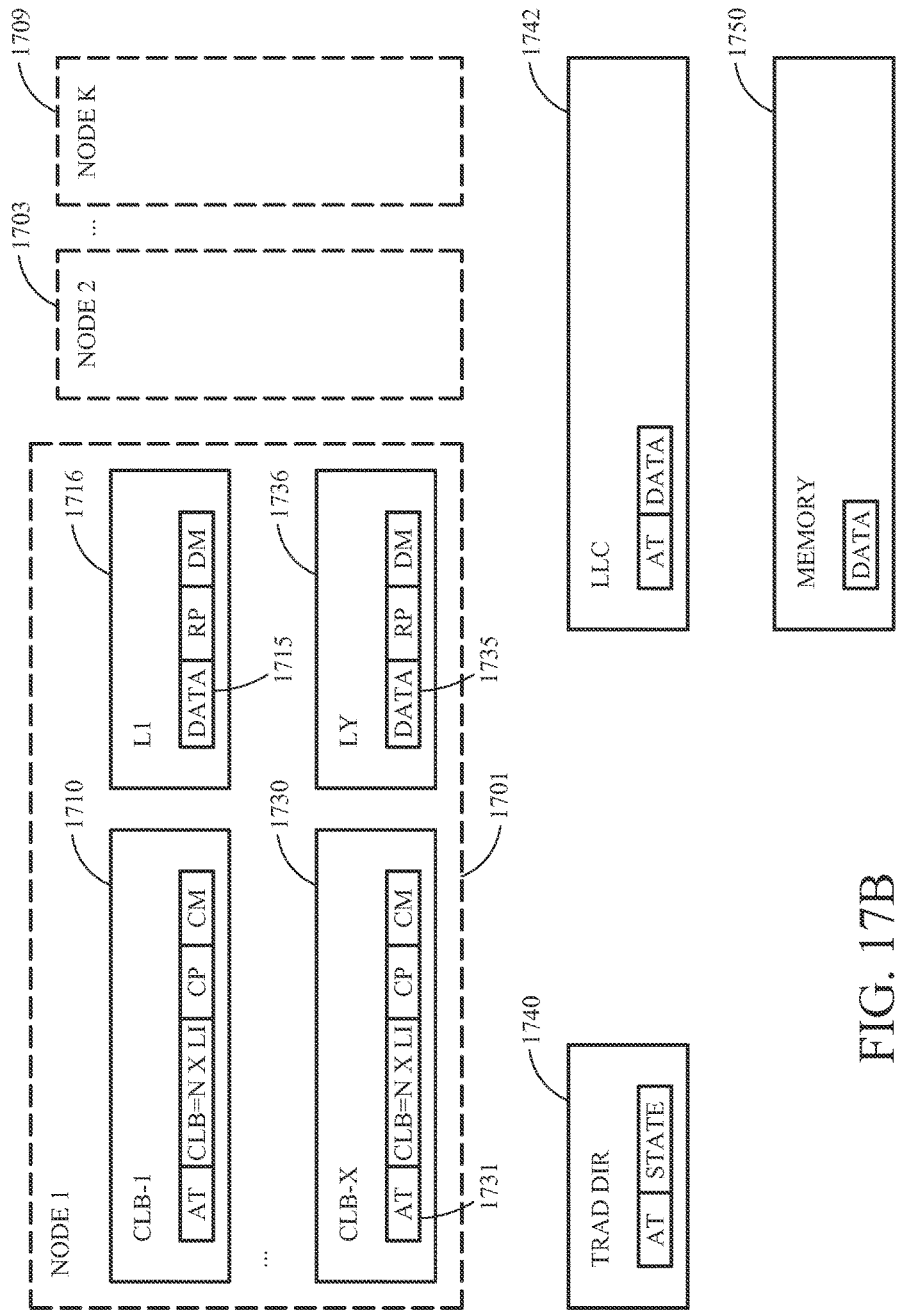
FIG. 17B is a block diagram illustrating a cache hierarchy with a shared tagged last-level cache and a directory according to an embodiment.

FIG. 17B shows K nodes 1701, 1703 . . . 1709) each with Y cache levels, exemplified by caches 1716 and 1736, and X CLB levels, exemplified by CLBs 1710 and 1730, connected to a last-level cache LLC 1742. Each node could, for example, be a three-level tag-less node (such as 1350 in FIG. 13), a node with mixed tag-less and traditional caches (such as 1450 in FIG. 14) or a node consisting of only traditional caches, such as the nodes consisting of a core 101 and a private cache hierarchy, symbolized by a single cache level 102 in FIG. 1. Each node could also contain several lower-level caches sharing cache level X (such as the cache hierarchy depicted in FIG. 10). A (main) memory 1750 can also be included in the system, and each node is associated with a processor or core (not shown), making the system of FIG. 17B (as well as those of FIGS. 18-20 to be described below) a multicore processing system. In all examples, installation of cachelines the node caches as well as the LLC may be guided by a cache placement policy, such as RAP discussed earlier.

In FIG. 17B, the last-level cache LLC 1742 is a traditional cache. The CLB entries in each node tracks a cacheline location as long as the cacheline resides in that node, but the LLC tracks the location of its cachelines using a traditional address tag (AT) to compare with a part of the address of a request accessing the LLC. The coherent state associated with a cacheline residing in a node is encoded in its associated metadata DM in its cache levels or and/or its metadata CM of its CLB entries associated with an accessed cacheline.

When a CLB entry 1731 is evicted from CLB-Y 1730, all valid cachelines e.g., cachelines 1715, 1735, in Node-1 1701 associated with that entry should be evicted, known as forced eviction. When a requested cacheline can not be found in the caches of the local node, or are found in the caches of the local node with a coherence state associated with the cacheline which can not fulfill the request type, then a request is sent to LLC 1742. If the requested cacheline is not found in an appropriate state in LLC, a request is sent to the traditional directory 1740. Accesses to LLC 1742 and the directory 1740 may also performed in parallel. The state information in the directory 1740 can be organized in any traditional way, for example as a fully-mapped directory with one presence bit corresponding to each node stored for each of its tracked cachelines. It is possible that the directory information is integrated into the LLC 1742 and that it is associated with the same address tag AT as the DATA entry of a cacheline.

The system depicted in FIG. 17B is agnostic of the nature of the cache coherence protocol used to keep cacheline values of the K nodes, the LLC and the memory coherent. Most traditional coherence protocols should map well to the architecture and functionality described here.

When a node receives a coherence request from the coherence protocol, for example an invalidate, a copy-back request, or a copy-back-and-invalidate request, it is handled in similar way to the system described in FIG. 9.

Figure 18:
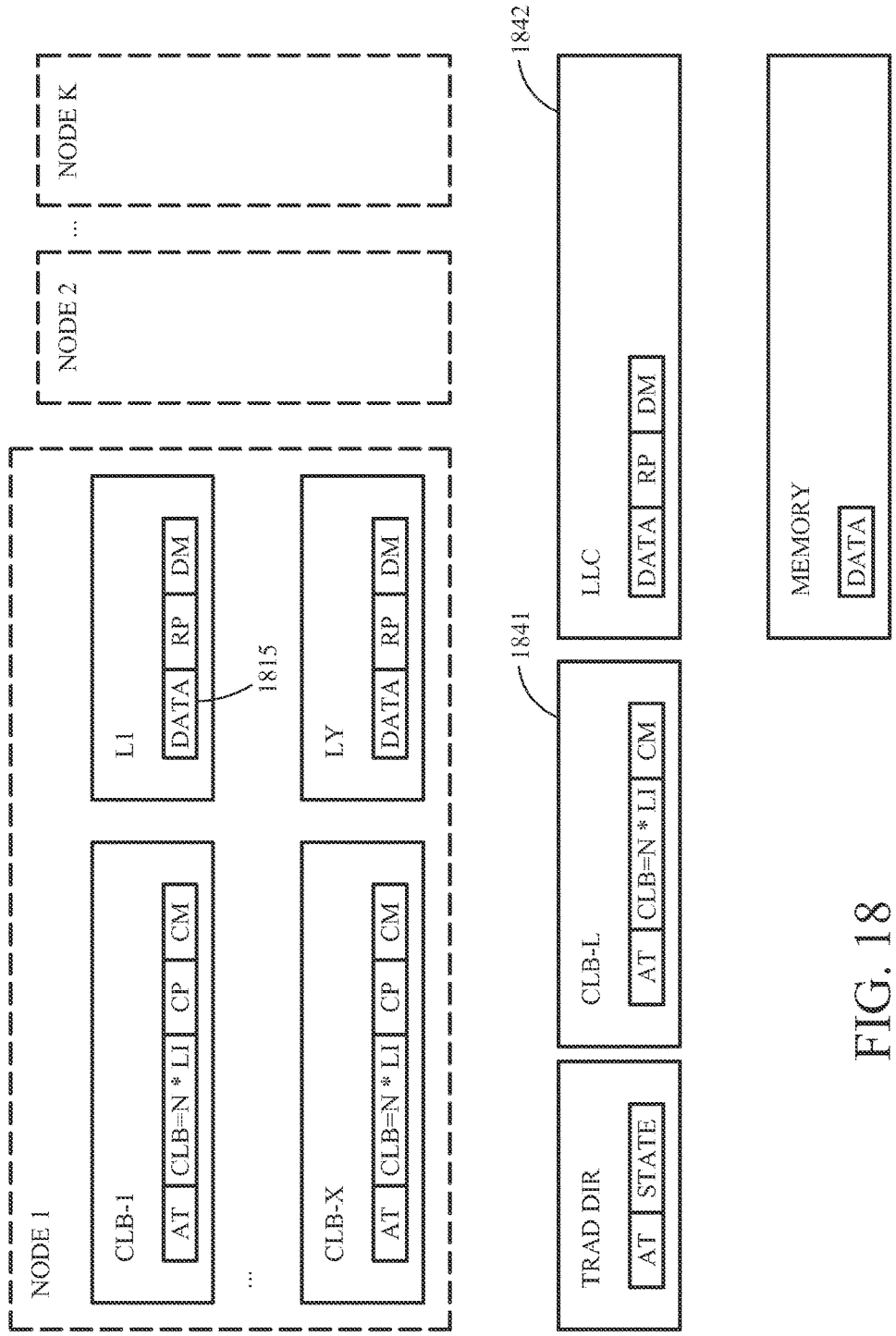
FIG. 18 is a block diagram illustrating a cache hierarchy with a shared tag-less last-level cache and a directory according to an embodiment.

FIG. 18 shows a system built of similar nodes, memory and directory as described for FIG. 17B, but with a tag-less last-level cache LLC 1842. Only differences between the system of FIGS. 17B and 18 are discussed here, and reference should be made to the foregoing description for an understanding of the unnumbered elements in FIG. 18. Similar to other tag-less caches described in this detailed description, the system of FIG. 18 is accompanied by a CLB structure CLB-L 1841. Each entry in CLB-L 1841 contains an address tag associated with its micropage, N locality information LI entries corresponding to each of the N cachelines associated with the micropage, and possibly some additional metadata CM associated with the micropage.

The CLB entries in a node may contain LI information pointing to a primary location in the node's own cache levels 1 through X, but could also contain a pointer to a location in the LLC 1842 (e.g., by storing Level=LLC and Way="the-corresponding-LLC-way"). If a node contains a valid LI pointer for an associated cacheline either pointing to a cache location within the node itself or pointing to a location in the LLC, a directory entry associated with a cacheline should keep track of this node as having a valid reference to the cacheline. This allows the coherence protocol to notify the node whenever the cacheline is moved or invalidated.

Figure 19:
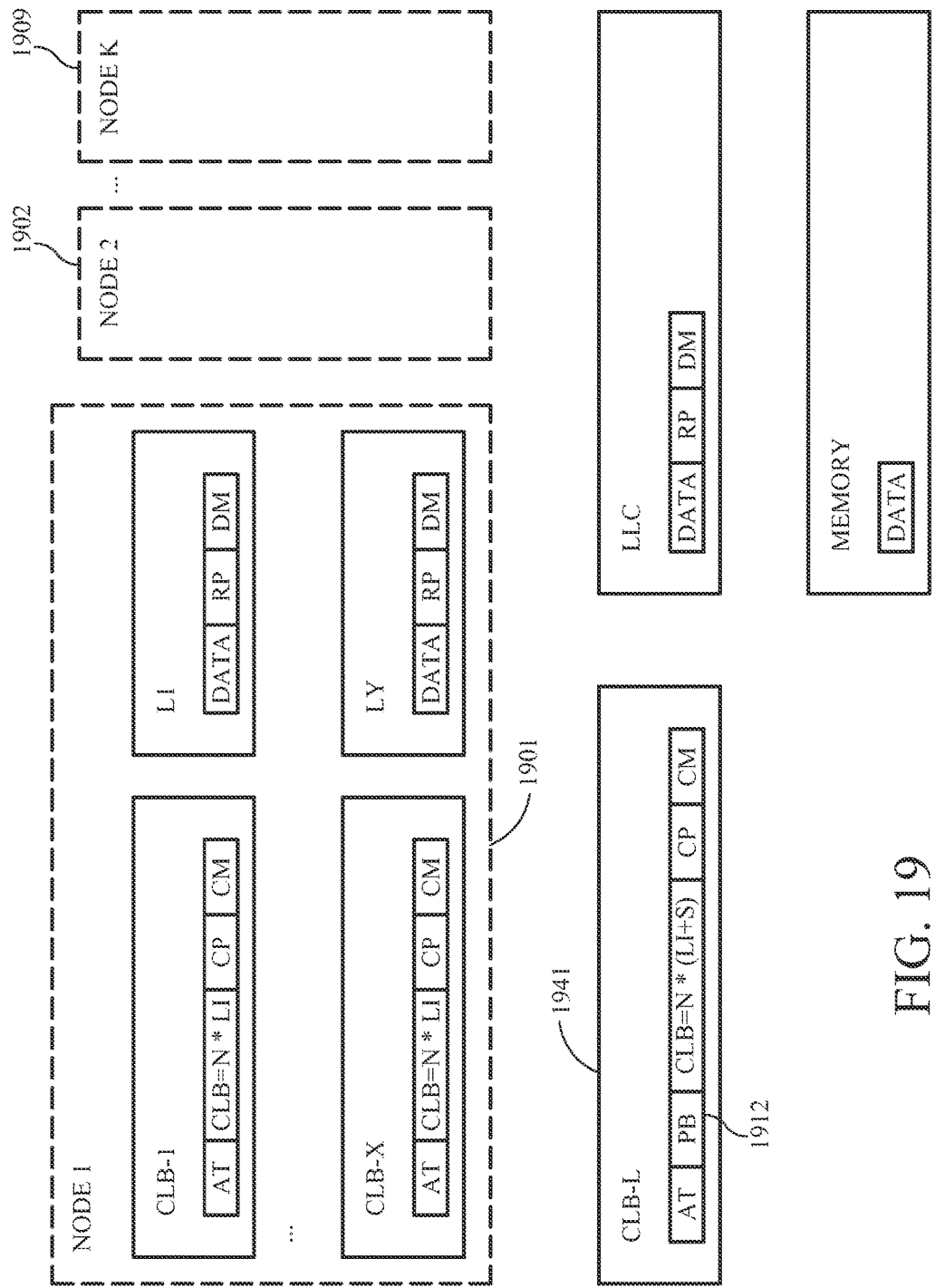
FIG. 19 is a block diagram illustrating a cache hierarchy with a shared tag-less last-level cache and having some of the directory functionality integrated into the associated CLB-L according to an embodiment.

FIG. 19 shows a system built of similar nodes and memory as described for FIGS. 17B and 18 above, and thus a description of the unnumbered elements is omitted for brevity but may be found above, but with its traditional directory 1840 removed. Instead, each entry in the CLB-L 1941 will take on the data-tracking roles of the CLB-L 1841, as well as some of the roles of the traditional directory 1840. More specifically, an LI entry in the CLB-L 1941 can point to either a location in LLC 1942 or to one of the K nodes 1901, 1902, . . . 1909. In one embodiment, either the identified LLC location or the identified node is responsible for replying to certain coherence requests. Examples of such requests include copyback, or copyback-invalidate requests. These requests are also sometimes referred to as read-requests and read-exclusive-requests, respectively, but many other terms are also used in different coherence protocol descriptions.

Each CLB-L entry also contains a field of presence bits PB 1912 associated with its micropage, indicating which of the K nodes may have valid copies of either of the cachelines associated with the micropage. The representation of the PB field 1912 could be based on any directory representation, including but not limited to fully mapped directories, limited pointer solutions or course-grain representations. In one embodiment, the PB field 1912 identifies all nodes with a valid CLB-X entry for this micropage, while the LI field associated with a specific cacheline identifies the node, or a specific location in the LLC, that should respond to a copyback or copyback-invalidate request. The presence bits, PB, in each CLB-L 1941 entry identify the nodes that need to be notified when a cacheline associated with the CLB-L entry is to be invalidated. In one embodiment, CLB-L 1941 does not contain any PB fields and invalidates are sent to all nodes.

Each CLB-L entry may also contain state information (denoted S in FIG. 19) for each of the N cachelines associated with the entry. The state value may for example indicate if the LI pointer points to a node or a LLC location. It may also indicate if there may be other valid copies of the associated cacheline in the system outside of the node or LLC location pointed to by the associated LI.

In one embodiment, only a cacheline in a cache of a node pointed to by an LI entry in a CLB-L may have an alternative location AP pointing to an LLC location. If this is not the case, the cacheline may simply just be removed with no further actions taken upon replacement.

Figure 20:
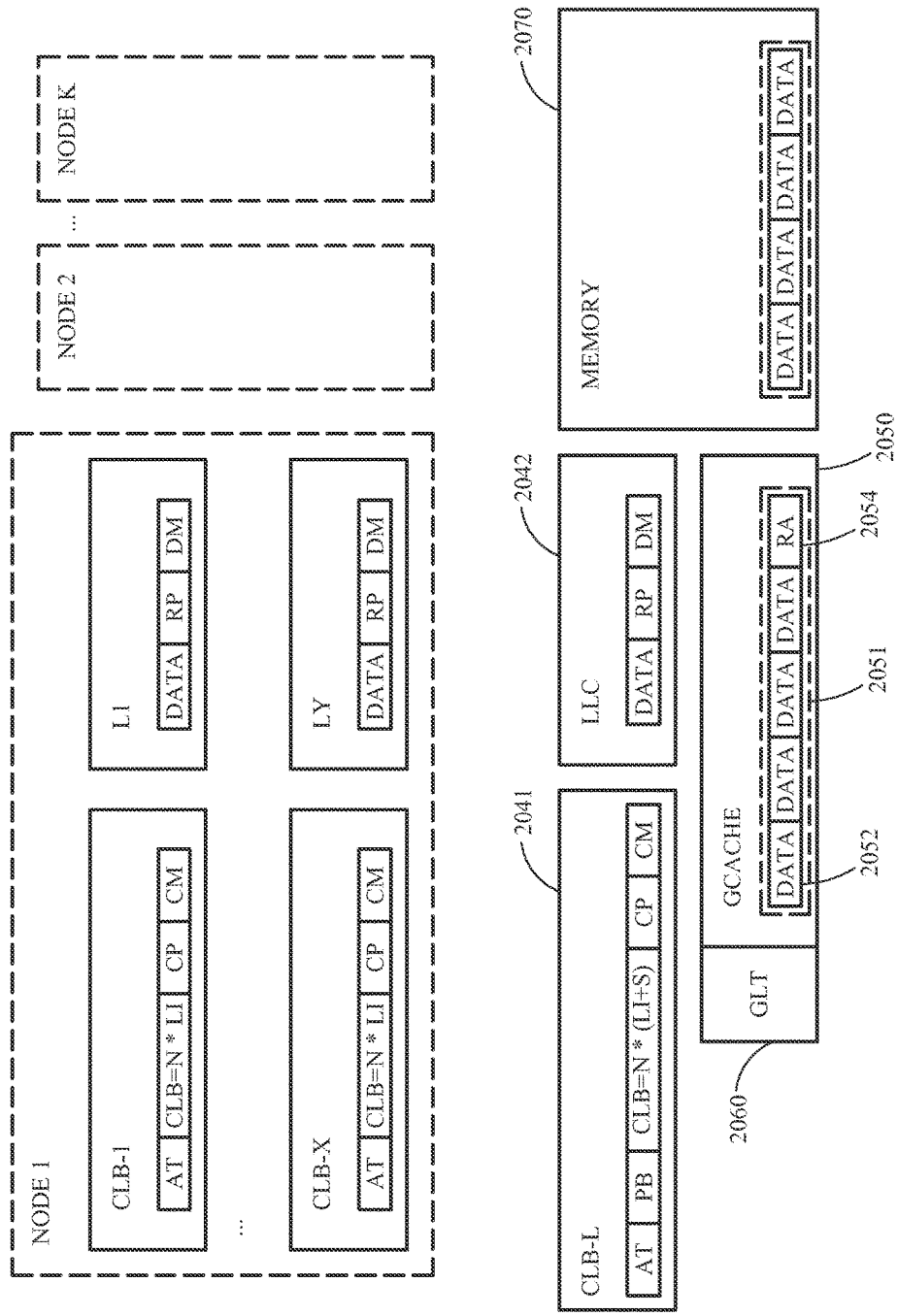
FIG. 20 is a block diagram illustrating a cache hierarchy with a shared tag-less last-level cache and having some of the directory functionality integrated into the associated CLB-L extended by a giant cache higher than the last-level cache according to an embodiment.

FIG. 20 shows the system of FIG. 19 extended by a giant cache, referred to as GCACHE 2050, according to an embodiment. One purpose, of the GCACHE 2050 is to store some of the cachelines that do not fit in the LLC 2042, or cachelines with an associated placement policy that that make them avoid storage in LLC 2042. The placement of cachelines in GCACHE 2050 may also be controlled by a placement policy (for example RAP) such that allocation in GCACHE 2050 may be avoided for some cachelines. Another purpose of GCACHE 2050 is to store cachelines associated with entries in the CLB-L location buffer 2041 that are replaced from CLB-L and thus forced to be evicted. A similar GCACHE can also be added to the system described in FIG. 18. As with previous embodiments, those unnumbered elements in FIG. 20 are described above and reference is made to those descriptions for brevity of the text. Similarly to the tag-less caches described earlier, the GCACHE 2050 can be implemented using any memory technology, including but not limited to SRAM, SSD, DRAM or any other memory technology Each entry 2051 in the GCACHE can hold the data portion of one or more cachelines 2052 and may also hold one replacement address RA 2054. The data of an entry 2051 is referred to herein as a superblock. The RA 2054 field identifies the superblock location in the next higher-level memory 2070. In one embodiment, the RA may consist of some upper bits of the physical address of the next higher-level memory 2070. In one embodiment, all the cachelines of a superblock are read from, and written to, the next higher-level memory 2070 in a batch. Note that, while some embodiments are not limited in this way, superblocks will typically contain a plurality of cachelines worth of data, and sometimes a large number, e.g., several KBs of data.

If the GCACHE 2050 is designed to be an extension to the memory hierarchy of FIG. 18, then LI entries of CLB-L 2041 may point to an LLC location or a GCACHE location (i.e., a GCACHE entry) storing, for example, way information about that location. If a GCACHE is configured to store more than one cacheline in each superblock, the LI entry in CLB-L 2041 will store the way information of the superblock containing a corresponding cachelines, and some page offset bits of that cacheline address used to locate the cacheline within the superblock. If the GCACHE is an extension to the memory hierarchy of FIG. 19 (as shown), then LI entries of CLB-L 2041 may point to a location in LLC, a location in GCACHE or to a node.

When a CLB entry is evicted from CLB-L 2041, and a cache placement policy indicates that its cachelines should be backed by the GCACHE, all its cachelines are evicted from the nodes and from the LLC, in such a way that all the data fields 2052 of the corresponding superblock contains valid cacheline values (forced eviction). Then, either a location information identifying the location of the superblock in the GCACHE 2050, or the address tag identifying the identity of the superblock is associated with the way of the set in which the superblock is stored, is stored in a Giant Location Table (GLT) 2060.

The information from the GLT 2060 is used to initialize a corresponding CLB-L entry on a CLB-L miss. If a corresponding superblock is determined to exist in the GCACHE, each LI associated with it is initialized to point to the GCACHE location of the corresponding superblock in the GCACHE. This information, together with a cacheline offset, can be used to identify the location for each cacheline of the superblock. As discussed earlier, when an entry from a higher-level CLB is used to fill an entry of lower-level CLB, such as a CLB-1 of FIG. 20, the LI location information from higher-level CLB entries are used to compose the LI location information of lower-level CLB entries. That way, the CLB-1 entry will be initialized to have all its LIs pointing directly to the right location in GCACHE and can access all the cachelines covered by one CLB-1 entry directly.

In one embodiment, each superblock of the higher-level memory 2070 has an entry in GLT 2060. In one embodiment, assuming a 7-way associative organization of GCACHE 2050, each entry in the GLT 2060 encodes a way information of the corresponding location of its associated superblock (way=0 indicates that the superblock does not reside in the cache), and one dirty bit indicating that the superblock is dirty. Assuming a superblock size of 1 kbyte, the size of the GLT needs to be 0.05% of the size of the next higher-level memory 2070.

In one embodiment, the GLT 2060 records the entries in the GLT that have valid mappings to GCACHE locations. This could for example be implemented as a GLT 2060 with the same number of entries as the number of sets in the GCACHE 2050. Each entry in the GLT 2060 contains a corresponding address tag for each of the superblocks of the ways mapping to that set.

GLT 2260 can be implemented in many ways, for example it may be co-located with the GCACHE (as shown in FIG. 20), co-located with the CLB-L 2041 or LLC 2042, or implemented separately. In one embodiment, the GLT 2060 is accessed when there is a CLB-L miss using a physical address.

In one embodiment, entire GCACHE superblocks 2051 are read/written to/from the next higher-level memory. In one embodiment, the superblock size is identical to the micropage size of CLB-L 2041. In one embodiment, the number of superblocks transferred to/from GCACHE 2250 varies and can, for example, be dynamically adjusted for different datasets.

Figure 21:
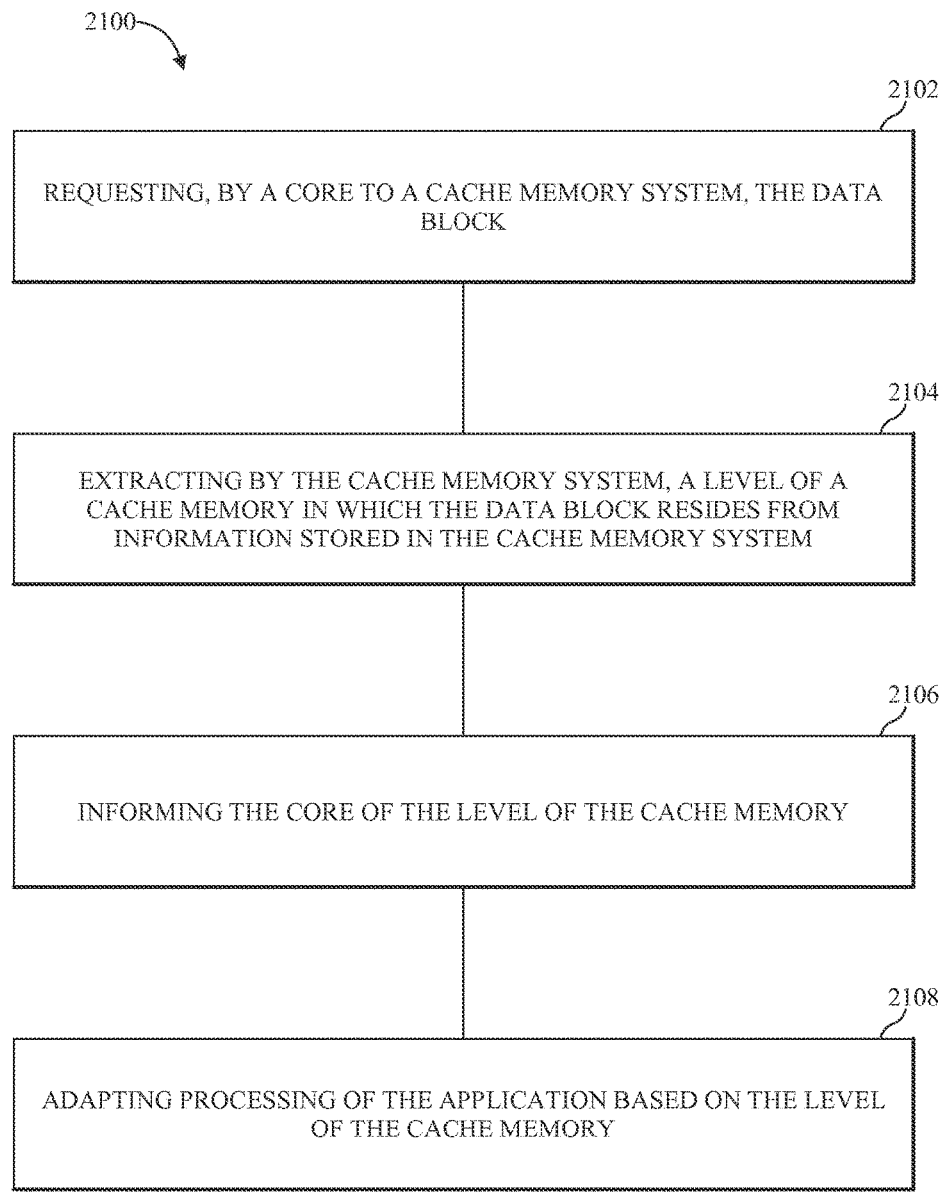
FIGS. 21-23 are flowcharts illustrating various method embodiments.

Although described structurally above, the foregoing embodiments can also be characterized in other ways, e.g., as methods. For example, an as shown in FIG. 21, a method 2100 or adapting application processing based on a level of a cache in which a requested data block resides can include the step 2102 of requesting, by a core to a cache memory system, a data block. A level of a cache memory in which the data block resides is extracted from information stored in the cache memory system at step 2104. The core is informed of the level at step 2106 and processing of the application is adapted based on the level at step 2108.

Figure 22:
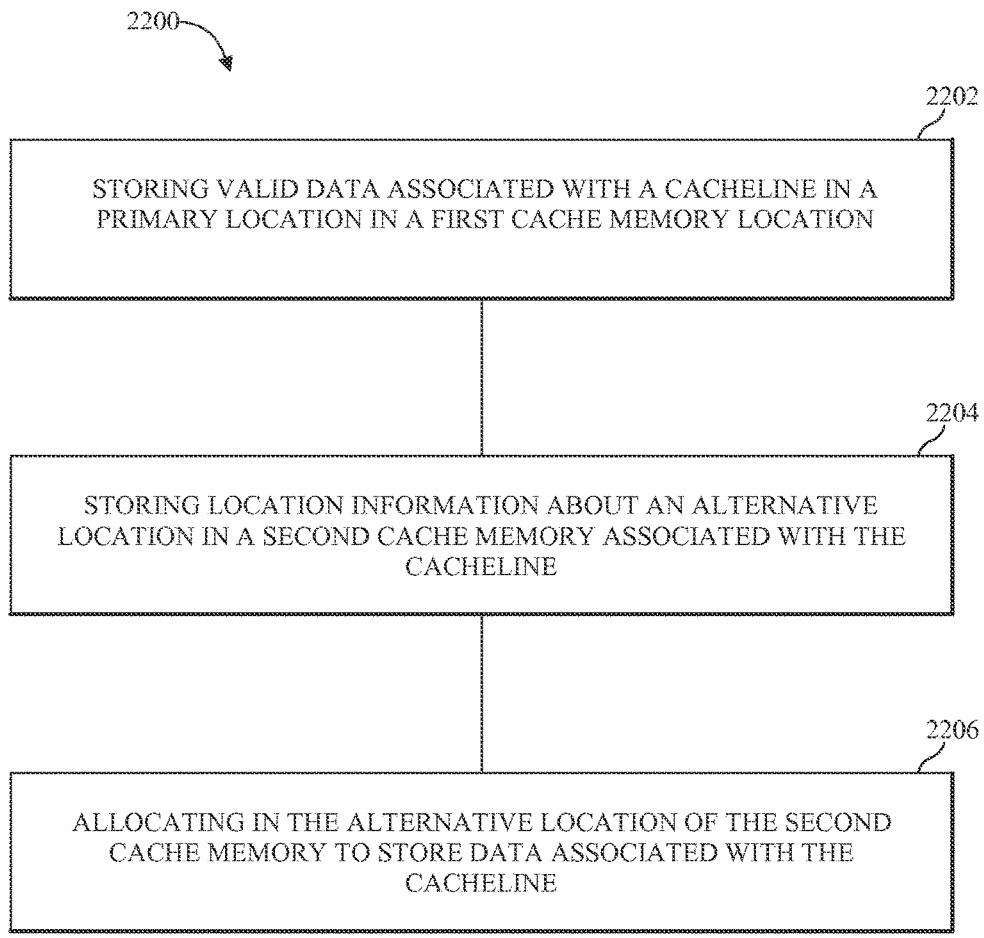

According to another embodiment, a method 2200 for storing data in a multi-level cache hierarchy memory system includes the steps illustrated in FIG. 22. At step 2202 valid data associated with a cacheline is stored in a primary location in a first cache memory stores valid data associated with the cacheline. Location information about an alternative location is stored in a second cache memory associated with the cacheline at step 2204. At step 2206, space is allocated (reserved) in the alternative location of the second cache memory to store data associated with the cacheline.

Figure 23:
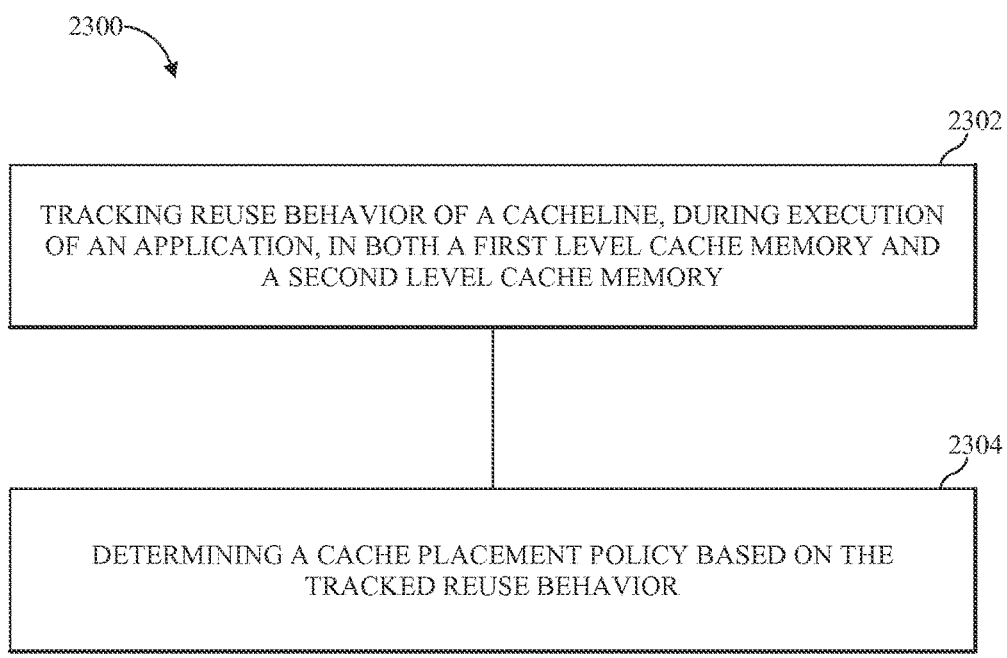

According to another embodiment, a method 2300 for selectively storing cachelines in a multi-level cache hierarchy, containing at least a first cache memory and a second cache memory, is illustrated in the flowchart of FIG. 23. Therein, at step 2302 reuse behavior of a cacheline is tracked, during execution of an application, in both a first level cache memory and a second level cache memory. Based on the tracked reuse behavior, a cache placement policy for that cacheline is determined at step 2304.

For clarity, most descriptions herein generally describe techniques for how a cacheline is located and returned to a requesting CPU. The descriptions do not describe in detail the various ways in which a requested word contained within the cacheline is selected and returned to the CPU, which will be apparent to those skilled in the art and would have unnecessarily obscured the invention.

For clarity, most descriptions herein describing the handling of data of cache hierarchies describe exclusive cache hierarchies. Those skilled in the art would understand that the described embodiments can be extended to also cover inclusive memory hierarchies and non-exclusive memory hierarchies.

Although the embodiments described above are useful in association with both uni-processor systems and multi-processor system, such as those illustrated and described above with respect to FIGS. 1 and 2 respectively, the CLB according to the foregoing embodiments is illustrated mostly in association with a uniprocessor system, but those skilled in the art will appreciate that the embodiments are thus not limited to such an implementation.

Although described above in the context of certain exemplary computer architectures, caching exists in many other settings within, as well as outside, a computer system and the foregoing embodiments are equally applicable to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, the embodiments described herein are equally applicable for implementing the various caching schemes.

The disclosed embodiments describe, for example, systems and methods associated with various cache hierarchies. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer processing system comprising:
a plurality of nodes, each node having at least one processor core and at least one level of cache memory which is private to the node,
at least a first-level cache location buffer accessed using virtual addresses, the first-level cache location buffer containing cache location entries, each cache location entry storing a virtual address tag, and a plurality of location information;
a shared, associative last level cache (LLC) memory device; and
a shared, last level cache location buffer accessed using physical addresses, the shared last level cache location buffer containing cache location entries, each cache location storing physical address tag and a plurality of location information, wherein the shared, last level cache location buffer is shared among the plurality of nodes;
wherein the location information stored in the first-level cache location buffer can point to an identified cacheline's location in the shared, associative last level cache memory device and can also specify an associative way location within the shared, associative last level cache memory device that stores a cacheline associated with the location information,
wherein the location information stored in the last level cache location buffer can point to an identified cacheline's associative way location within the shared, associative last level cache memory device that stores a cacheline associated with the location information, and
wherein the location information stored in the last level cache location buffer can point to an identified cacheline's location being in any of the plurality of nodes.

2. The computer processing system of claim 1, wherein each cache location entry in the shared last level cache location buffer stores a field of presence bits, the presence bits in a cache location entry indicating which of the plurality of nodes have a valid cache location entry in the node which is tracking at least one of the cachelines tracked by the cache location entry.

3. The computer processing system of claim 1, wherein information about which of the plurality of nodes have a valid cache location entry identifies nodes that need to be notified when a cacheline associated with the respective cache location entry is to be invalidated.

4. The computer processing system of claim 1 wherein each cache location entry in the shared last level cache location buffer also stores information about which location within a cache location buffer within a node in each respective valid cache location entry is stored.

5. The computer processing system of claim 1, wherein each cache location entry in the first level cache location buffer also stores a physical index.

6. A system comprising:
a plurality of processor cores and a plurality of associative caches;
wherein each associative cache has several alternative containers where an individual cacheline associated with a cacheline address may be stored,
wherein an alternative container within an associative cache where the individual cacheline identified by the cacheline address is known to reside is referred to as its way location within that cache,
a shared last level cache (LLC) memory device shared by a plurality of nodes and organized to store a plurality of individual cachelines;
wherein each individual cacheline may be stored in an associative cache way independent of the cache way where other cachelines are stored;
shared cache location buffer (CLB), the shared cache LLC location buffer storing location information, where each location information is associated with a cacheline address and wherein the location information stores information about in which associative cache, and in which way location within that associative cache, the cacheline associated with the same cacheline address as the cacheline address associated with the location information is stored; and
an associative giant cache (GCACHE) storing a plurality of superblocks, each superblock including several cacheline-sized containers, wherein location information stored in the CLB can identify the GCACHE as the associative cache and way information identifying a way location of the superblock where the cacheline associated with the location information cacheline address is stored, wherein a portion of the cacheline address is used to determine the cacheline's offset within a superblock.

7. The system of claim 6, wherein all cachelines tracked by a shared CLB location buffer entry are evicted from the shared LLC memory device upon eviction of a shared LLC location buffer entry.

8. The system of claim 6, the system containing a giant location table (GLT), storing individual location information for the plurality of superblocks in the GCACHE.

9. The system of claim 8, wherein a GLT entry also stores a dirty indicator, indicating that the superblock corresponding to that GLT entry stores dirty data that differs from the corresponding data that is stored in memory.

10. The system of claim 8, wherein the GLT is organized to hold one entry for each superblock of memory and each superblock in the GCACHE has a portion of a physical address associated therewith which identifies a memory location associated with the data in the superblock.

11. The system of claim 8, wherein the GLT is organized to hold one entry for each address associated with each superblock in the GCACHE.

12. The system of claim 6, including a giant location table (GLT) storing individual location information for each of the plurality of superblocks in the GCACHE;
wherein GLT location information is used to initialize a new location buffer entry in the shared CLB upon a miss in the shared CLB buffer and wherein the location information stored in the new location buffer entry stores a location of the superblock where corresponding cachelines reside.

13. The system of claim 6, wherein data is transferred between memory and the GCACHE in superblock chunks.

14. The system of claim 6, wherein the location information read from the shared CLB can identify the LLC as the cache storing requested data and also identify the way within the LLC where the cacheline is known to reside.

15. The system of claim 6, further comprising:
a giant location table (GLT) storing G-location information, wherein each G-location information is associated with a superblock address and wherein the G-location information includes information about in which associative G-way within that GCACHE, the superblock associated the same superblock address as the superblock address associated with the G-location information is stored.

16. The system of claim 15, wherein when location information for a cacheline address can not be found in the shared CLB, the G-location information for the superblock address containing the cacheline address is looked up in the GLT and its G-way is read out, and location information for all the cacheline addresses of the cachelines of the superblock are updated to store the GCACHE and G-way as being where the container storing each respective cacheline resides.

17. The system of claim 6, wherein a cacheline stored in the GCACHE can be accessed by finding a match for its associated cacheline address to read out its corresponding location information, the location information being used to locate the superblock storing the cacheline and its cacheline address offset within a superblock being used to locate the container within the superblock storing the cacheline.

* * * * *